US010609150B2

(12) United States Patent
Lan et al.

(10) Patent No.: US 10,609,150 B2
(45) Date of Patent: *Mar. 31, 2020

(54) LOCK MANAGEMENT METHOD IN CLUSTER, LOCK SERVER, AND CLIENT

(71) Applicant: Huawei Technologies Co., Ltd., Shenzhen (CN)

(72) Inventors: Wenhai Lan, Shenzhen (CN); Wei Zhang, Shenzhen (CN); Xueyou Wang, Shenzhen (CN); Yue Zhang, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 16/287,479

(22) Filed: Feb. 27, 2019

(65) Prior Publication Data

US 2019/0199801 A1 Jun. 27, 2019

Related U.S. Application Data

(63) Continuation of application No. 15/955,276, filed on Apr. 17, 2018, now Pat. No. 10,257,282, which is a
(Continued)

(51) Int. Cl.
*H04L 29/08* (2006.01)
*G06F 15/177* (2006.01)
(Continued)

(52) U.S. Cl.
CPC ............... *H04L 67/14* (2013.01); *G06F 9/52* (2013.01); *G06F 9/526* (2013.01); *G06F 15/177* (2013.01);
(Continued)

(58) Field of Classification Search
CPC . H04L 67/14; H04L 67/10; G06F 9/52; G06F 9/526; G06F 15/17331; G06F 15/177; G06F 3/0622; G06F 3/0637; G06F 3/067
See application file for complete search history.

(56) References Cited

U.S. PATENT DOCUMENTS 5,592,673 A     1/1997   Kurabayashi et al.
5,832,484 A * 11/1998   Sankaran ............ G06F 16/2343
(Continued)

FOREIGN PATENT DOCUMENTS

CN     103458036 A    12/2013
CN     104063355 A    9/2014
(Continued)

OTHER PUBLICATIONS

Machine Translation and Abstract of Japanese Publication No. JPH0383142, Apr. 9, 1991, 3 pages.
(Continued)

*Primary Examiner* — Michael Won
(74) *Attorney, Agent, or Firm* — Conley Rose, P.C.

(57) ABSTRACT

A lock management solution in a cluster, where the cluster includes a client and a lock server, the lock server includes an interface card and a memory, the memory stores a read lock request queue recording an identifier of a client waiting for a read lock or obtaining the read lock, the memory further stores a write lock request queue recording an identifier of a client waiting for a write lock or obtains the write lock, and the memory further includes a read lock allocation count and a write lock allocation identifier, where the read lock allocation count records an allocated read lock, and the write lock allocation identifier indicates whether the write lock has been allocated.

20 Claims, 5 Drawing Sheets

Related U.S. Application Data continuation of application No. PCT/CN2015/097267, filed on Dec. 14, 2015.

(51) Int. Cl.
*G06F 9/52* (2006.01)
*G06F 15/173* (2006.01)
*G06F 3/06* (2006.01)

(52) U.S. Cl.
CPC ........ *G06F 15/17331* (2013.01); *G06F 3/067* (2013.01); *G06F 3/0622* (2013.01); *G06F 3/0637* (2013.01)

(56) References Cited

U.S. PATENT DOCUMENTS

| | | | |
|---|---|---|---|
| 6,389,420 B1* | 5/2002 | Vahalia | G06F 16/1774 |
| 6,466,978 B1 | 10/2002 | Mukherjee et al. | |
| 7,155,638 B1 | 12/2006 | Heideman et al. | |
| 8,775,718 B2* | 7/2014 | Kanevsky | G06F 3/061 370/389 |
| 8,935,307 B1 | 1/2015 | Srinivasan et al. | |
| 2003/0014564 A1 | 1/2003 | Isoda et al. | |
| 2003/0200398 A1 | 10/2003 | Harris | |
| 2004/0111462 A1 | 6/2004 | Minato | |
| 2004/0220913 A1 | 11/2004 | Walker | |
| 2004/0236798 A1 | 11/2004 | Srinivasan et al. | |
| 2005/0039049 A1 | 2/2005 | Chang et al. | |
| 2006/0242644 A1 | 10/2006 | Blue | |
| 2007/0192524 A1 | 8/2007 | Chan et al. | |
| 2008/0222223 A1 | 9/2008 | Srinivasan et al. | |
| 2008/0263549 A1 | 10/2008 | Walker | |
| 2010/0268904 A1* | 10/2010 | Sheffield | G06F 3/0613 711/163 |
| 2014/0289483 A1* | 9/2014 | Hosoda | G06F 13/1689 711/152 |
| 2016/0043897 A1 | 2/2016 | Xing | |
| 2016/0364158 A1* | 12/2016 | Narayanan | G06F 3/0619 |
| 2017/0371787 A1* | 12/2017 | Kalyanasundharam | G06F 12/0813 |
| 2018/0095878 A1* | 4/2018 | Katayama | G06F 12/084 |
| 2018/0234503 A1* | 8/2018 | Lan | G06F 15/177 |

FOREIGN PATENT DOCUMENTS

| | | |
|---|---|---|
| CN | 104461707 A | 3/2015 |
| CN | 104536834 A | 4/2015 |
| EP | 0595453 A1 | 5/1994 |
| JP | H0383142 A | 4/1991 |
| JP | H04271453 A | 9/1992 |
| JP | H10895841 A | 4/1996 |
| JP | H10926907 A | 1/1997 |
| JP | H10981438 A | 3/1997 |
| JP | H09325894 A | 12/1997 |
| JP | H11327815 A | 11/1999 |
| JP | 2001067238 A | 3/2001 |
| JP | 2001117807 A | 4/2001 |
| JP | 2006525573 A | 11/2006 |
| JP | 2009526324 A | 7/2009 |
| JP | 2014048969 A | 3/2014 |
| WO | 9938095 A1 | 7/1999 |

OTHER PUBLICATIONS

Machine Translation and Abstract of Chinese Publication No. CN103458036, Dec. 18, 2013, 9 pages.
Machine Translation and Abstract of Chinese Publication No. CN104461707, Mar. 25, 2015, 38 pages.
Machine Translation and Abstract of Chinese Publication No. CN104536834, Apr. 22, 2015, 22 pages.
Machine Translation and Abstract of Japanese Publication No. JP2001067238, Mar. 16, 2001, 15 pages.
Machine Translation and Abstract of Japanese Publication No. JP2014048969, Mar. 17, 2014, 40 pages.
Machine Translation and Abstract of Japanese Publication No. JPH0895841, Apr. 12, 1996, 21 pages.
Machine Translation and Abstract of Japanese Publication No. JPH0926907, Jan. 28, 1997, 9 pages.
Machine Translation and Abstract of Japanese Publication No. JPH0981438, Mar. 28, 1997, 17 pages.
Machine Translation and Abstract of Japanese Publication No. JPH09325894, Dec. 16, 1997, 18 pages.
Devulapalli, A., et al, "Distributed Queue-based Locking using Advanced Network Features," International Conference on Parallel Processing, Aug. 1, 2005, 8 pages.
Dhanraj, V., "Scalable Data Centers Using InfiniBand, High Performance Distributed Lock Management Services using Network-based Remote Atomic Operations," CCGrid 2007, 37 pages.
Nakashima, T., et al, "Evaluation of Distributed Shared Memory Algorithm on PVM," Faculty of Engineering, Kumamoto University, Dec. 20, 2013, 8 pages.
Narravula, S., et al, "High Performance Distributed Lock Management Services using Network-based Remote Atomic Operations," Seventh IEEE International Symposium on Cluster Computing and the Grid, May 29, 2007, 8 pages.
Mitchell, C., et al., "Using One-Sided RDMA Reads to Build a Fast, CPU-Efficient Key-Value Store," 2013 USENIX Annual Technical Conference, pp. 103-114.
Kalia, A., et al., "Using RDMA Efficiently for Key-Value Services," SIGCOMM'14, Aug. 17-22, 2014, 15 pages.
Chung, Y., et al, "Using RDMA for Lock Management," Brown University Department of Computer Science, Jul. 12, 2015, 6 pages.
Foreign Communication From a Counterpart Application, Chinese Application No. 201580002558.6, Chinese Search Report dated Dec. 29, 2017, 9 pages.
Foreign Communication From a Counterpart Application, European Application No. 15909966.2, Extended European Search Report dated Feb. 2, 2018, 13 pages.
Foreign Communication From a Counterpart Application, Japanese Application No. 2016-567831, Japanese Notice of Allowance dated Feb. 6, 2019, 3 pages.
Foreign Communication From a Counterpart Application, PCT Application No. PCT/CN2015/097267, English Translation of International Search Report dated Sep. 20, 2016, 2 pages.
Foreign Communication From a Counterpart Application, PCT Application No. PCT/CN2015/097267, English Translation of Written Opinion dated Sep. 20, 2016, 6 pages.
Foreign Communication From a Counterpart Application, Japanese Application No. 2018-040616, Japanese Office Action dated Mar. 19, 2019, 2 pages.
Foreign Communication From a Counterpart Application, Japanese Application No. 2018-040616, English Translation of Japanese Office Action dated Mar. 19, 2019, 2 pages.

* cited by examiner

LOCK MANAGEMENT METHOD IN CLUSTER, LOCK SERVER, AND CLIENT

CROSS-REFERENCE TO RELATED APPLICATION

This application is a continuation of U.S. patent application Ser. No. 15/955,276 filed on Apr. 17, 2018, which is a continuation of International Patent Application No. PCT/CN2015/097267 filed on Dec. 14, 2015. Both of the aforementioned applications are hereby incorporated by reference in their entireties.

TECHNICAL FIELD

The present disclosure relates to the field of information technologies, and in particular, to a lock management method in a cluster, a lock server, and a client.

BACKGROUND

A cluster includes multiple clients, and in order to obtain a processing permission, such as a write permission or a read permission, of a shared resource in the cluster, a client needs to apply to a lock server in the cluster for a processing permission, which is generally referred to as applying for a lock. Generally, the write permission is also referred to as a write lock or an exclusive lock, and the read permission is referred to as a read lock or a shared lock.

In a manner of applying for a write lock by a client, as shown in FIG. 1, a cluster includes a lock server, a client A, and a client B. The client A writes an identifier of the client A into a memory address of the lock server using the Remote Direct Memory Access (RDMA) protocol, for example, applying to the lock server for a write lock using an atomic operation Compare-and-Swap in the RDMA protocol, that is, the client A obtains a write lock by applying to the lock server, that is, the write lock is allocated to the client A. The client B applies to the lock server for the write lock using the Compare-and-Swap, the lock server returns the identifier of the client A to the client B, and the client B applies to the client A for the write lock using the Compare-and-Swap and according to the identifier of the client A. Before the client A releases the write lock, the client B is in a write lock waiting state.

In an implementation solution, when the client A is faulty, because the lock server does not know that the client B is in a write lock waiting state, the client B cannot obtain the write lock by means of application, and is constantly in the write lock waiting state. It can be known from the foregoing description that, the lock server can obtain a lock state of only one current client.

SUMMARY

According to a first aspect, an embodiment of the present disclosure provides a lock management method in a cluster, where the cluster includes multiple clients and a lock server, the lock server includes an interface card and a memory, and the memory stores a write lock request queue, a write lock allocation identifier, and a read lock allocation count, the write lock request queue is used to record identifiers of clients in the cluster, including an identifier of a client that is in a write lock waiting state for a shared resource and an identifier of a client that obtains a write lock for the same shared resource, the write lock allocation identifier is used to indicate whether the write lock for the shared resource is allocated, and the read lock allocation count is used to indicate a quantity of read locks allocated for the shared resource, and the lock management method includes receiving, by the interface card, a first write lock request sent by a first client in the multiple clients, where the first write lock request carries an identifier of the first client and a memory address of a queue head of the write lock request queue, writing the identifier of the first client into the memory address of the queue head of the write lock request queue, querying, by the interface card, the read lock allocation count to determine whether a read lock has been allocated, and when the read lock is not allocated, setting the write lock allocation identifier to a write lock allocated state, and sending a message to the first client, to indicate that the first client obtains the write lock, and sending a second message to the first client when the read lock has been allocated, where the second message indicates that the first client is in a write lock waiting state. In this embodiment of the present disclosure, using the write lock request queue, the write lock allocation identifier, and the read lock allocation count in the memory, the lock server can determine that the client obtains the write lock or waits for the write lock.

With reference to the first aspect, in a first possible implementation manner, the cluster further includes a second client, and the method further includes receiving, by the interface card, a second write lock request sent by a second client in the multiple clients, where the second write lock request carries an identifier of the second client and a first memory address in the write lock request queue, and the first memory address is a memory address which is in a sequence from the queue head to a queue tail and into which the identifier of the second client can be written, except the memory address of the queue head of the write lock request queue, writing, by the interface card, the identifier of the second client into the first memory address in the write lock request queue, and sending, by the interface card, a message to the second client to indicate that the second client is in a write lock waiting state. Therefore, the lock server can determine, using the write lock request queue, a client that is in a write lock waiting state. Optionally, the first memory address is a first memory address which is in the sequence from the queue head to the queue tail and into which the identifier of the second client can be written, except the memory address of the queue head of the write lock request queue.

With reference to the first aspect, in a second possible implementation manner, the memory of the lock server includes a read lock request queue, and when the read lock allocation count indicates that the read lock has been allocated, the read lock request queue is used to record an identifier of a third client that is in the cluster and that obtains the read lock for the shared resource.

With reference to the first possible implementation manner, in a third possible implementation manner, the first write lock request further carries a lock lease, where the lock lease is used to indicate a validity period of the write lock. Using the lock lease, the lock server may release the write lock according to the lock lease.

With reference to the first possible implementation manner, in a fourth possible implementation manner, after the first client obtains the write lock, the method further includes receiving, by the interface card, a write lock release request sent by the first client, where the write lock release request carries the memory address of the queue head of the write lock request queue, setting, by the interface card, the write lock allocation identifier to a write lock unallocated state, and deleting, by the interface card, the identifier of the first client from the memory address of the queue head of the write lock request queue. The first client releases the write lock such that another client in the cluster may obtain the write lock.

With reference to the first possible implementation manner, in a fifth possible implementation manner, when the first client becomes faulty after obtaining the write lock, the method further includes setting, by the interface card, the write lock allocation identifier to a write lock unallocated state, and deleting, by the interface card, the identifier of the first client from the memory address of the queue head of the write lock request queue. Optionally, the interface card receives a notification sent by another client in the cluster, to determine that the first client is faulty. Releasing the write lock of the faulty first client can prevent the faulty first client from holding the write lock for a long time. Optionally, the interface card sends a notification to a client in the cluster except the first client, where the notification indicates that the write lock held by the first client has been released.

With reference to the fourth or fifth possible implementation manner, in a sixth possible implementation manner, the method further includes querying, by the interface card, the write lock request queue to determine the second client in the write lock waiting state, and sending, by the interface card, a notification to the second client, to instruct the second client to apply to the interface card for the write lock. The lock server instructs the client in the write lock waiting state to apply for the write lock in time With reference to the fifth possible implementation manner, in a seventh possible implementation manner, the method further includes sending, by the interface card, a notification to a client in the cluster except the first client, where the notification indicates that the write lock held by the first client has been released.

With reference to the fourth possible implementation manner, in an eighth possible implementation manner, the method further includes receiving, by the interface card, a write lock request query message sent by the first client, where the write lock request query message carries a next memory address following the queue head of the write lock request queue, querying, by the interface card, for a client identifier stored in the next memory address following the queue head of the write lock request queue, and sending, by the interface card, a write lock request query response message to the first client, where the write lock request query response message carries the client identifier stored in the next memory address.

With reference to the fourth possible implementation manner, in a ninth possible implementation manner, the method further includes querying, by the interface card, for a client identifier stored in a next memory address following the queue head of the write lock request queue, and sending, by the interface card, a notification to a client corresponding to the client identifier stored in the next memory address to instruct the client corresponding to the client identifier stored in the next memory address to apply for the write lock. Therefore, the write lock may be applied for according to a sequence, starting from the queue head of the write lock request queue, of the client in a write lock waiting state.

With reference to the fourth possible implementation manner, in a tenth possible implementation manner, the write lock request queue further stores a write lock priority of a client in a write lock waiting state, and the method further includes receiving, by the interface card, a write lock request query message sent by the first client, querying, by the interface card, for a write lock priority of a client in a write lock waiting state in the write lock request queue, and sending, by the interface card, a write lock request query response message to the first client, where the query response message carries an identifier and the write lock priority, which are recorded in the write lock request queue, of the client in the write lock waiting state.

With reference to the fourth possible implementation manner, in an eleventh possible implementation manner, the write lock request queue further stores a write lock priority of a client in a write lock waiting state, and the method further includes querying, by the interface card, for a write lock priority, which is recorded in the write lock request queue, of a client in a write lock waiting state to determine a client with a highest write lock priority, and sending, by the interface card, a notification to the client with the highest write lock priority to instruct the client with the highest write lock priority to apply for the write lock such that the client with the highest write lock priority applies for the write lock.

With reference to the fourth possible implementation manner, in a twelfth possible implementation manner, the method further includes querying, by the interface card, the write lock request queue to determine clients in a write lock waiting state, and sending, by the interface card, a notification to at least two clients in the clients in the write lock waiting state to instruct the at least two clients to send a write lock request to the interface card.

Corresponding to the first aspect, according to a second aspect, an embodiment of the present disclosure provides a lock management method in a cluster, where the cluster includes multiple clients and a lock server, the lock server includes an interface card and a memory, and the memory stores a write lock request queue, a write lock allocation identifier, and a read lock allocation count, the write lock request queue is used to record identifiers of clients in the cluster, including an identifier of a client that is in a write lock waiting state for a shared resource and an identifier of a client that obtains a write lock for the same shared resource, the write lock allocation identifier is used to indicate whether the write lock for the shared resource is allocated, and the read lock allocation count is used to indicate a quantity of read locks allocated for the shared resource, and the lock management method includes sending, by a first client in the multiple clients, a first write lock request to the interface card of the lock server, where the first write lock request carries an identifier of the first client and a memory address of a queue head of the write lock request queue, and receiving, by the first client, a first message sent by the interface card, where the first message indicates that the interface card writes the identifier of the first client into the memory address of the queue head of the write lock request queue and indicates that the first client obtains the write lock or is in a write lock waiting state, and sending, by the first client, a second write lock request to the interface card when the first message indicates that the interface card fails in writing the identifier of the first client into the memory address of the queue head of the write lock request queue, where the second write lock request carries the identifier of the first client and a first memory address in the write lock request queue, and the first memory address is a memory address which is in a sequence from the queue head to a queue tail and into which the identifier of the first client can be written. Optionally, the first memory address is a first memory address which is in the sequence from the queue head to the queue tail and into which the identifier of the first client can be written.

With reference to the second aspect, in a first possible implementation manner, the first write lock request and the second write lock request further carry a lock lease, where the lock lease is used to indicate a validity period of the write lock. The lock server may release an expired write lock of the first client according to the lock lease to prevent the first client from occupying the write lock for a long time.

With reference to the second aspect, in a second possible implementation manner, after the first client obtains the write lock, the method further includes sending, by the first client, a write lock release request to the interface card, where the write lock release request carries the memory address of the queue head of the write lock request queue.

With reference to the second possible implementation manner, in a third possible implementation manner, the method further includes sending, by the first client, a write lock request query message to the interface card, where the write lock request query message carries a next memory address following the queue head of the write lock request queue, receiving a write lock request query response message sent by the interface card, where the write lock request query response message carries a client identifier stored in the next memory address following the queue head of the write lock request queue, and sending, by the first client according to the client identifier carried in the write lock request query response message, a notification to a client corresponding to the client identifier stored in the next memory address following the queue head of the write lock request queue, to instruct the client to apply for the write lock.

With reference to the second possible implementation manner, in a fourth possible implementation manner, the method further includes sending, by the first client, a write lock request query message to the interface card, receiving a write lock request query response message sent by the interface card, where the query response message carries an identifier and a write lock priority, which are recorded in the write lock request queue, of a client in a write lock waiting state, determining, by the first client, a client with a highest write lock priority according to the write lock request query response message, and sending, by the first client, a notification to the client with the highest write lock priority to instruct the client with the highest write lock priority to send a write lock request to the interface card.

According to a third aspect, an embodiment of the present disclosure provides another lock management method in a cluster, where the cluster includes a first client and a lock server, the lock server includes an interface card and a memory, and the memory stores a read lock request queue and a write lock allocation identifier, the read lock request queue is used to record an identifier of a client that is in the cluster and that is in a read lock waiting state or obtains a read lock for a same shared resource, and the write lock allocation identifier is used to indicate whether a write lock for the shared resource is allocated, and the lock management method includes receiving, by the interface card, a first read lock request sent by a first client in multiple clients, where the first read lock request carries an identifier of the first client and a first memory address in the read lock request queue, writing, by the interface card, the identifier of the first client into the first memory address in the read lock request queue, and sending, by the interface card, a first message to the first client, where the first message carries the write lock allocation identifier. Using the read lock request queue, a read lock request status of a client in the cluster can be recorded, that is, the client is in a read lock waiting state or obtains a read lock.

With reference to the third aspect, in a first possible implementation manner, when the write lock allocation identifier indicates that the write lock has been allocated, the first message indicates that the first client is in a read lock waiting state.

With reference to the third aspect, in a second possible implementation manner, the memory further stores a read lock allocation count, where the read lock allocation count is used to indicate a quantity of read locks allocated for the shared resource, and when the write lock allocation identifier indicates that the write lock is not allocated, the interface card increases the read lock allocation count according to a quantity of read locks allocated to the first client, and the first message indicates that the first client obtains a read lock.

With reference to the first possible implementation manner of the third aspect, in a third possible implementation manner, the multiple clients further include a second client, and the memory further stores a write lock request queue, where the write lock request queue is used to record identifiers of clients in the cluster, including an identifier of a client that is in a write lock waiting state for the shared resource and an identifier of a client that obtains the write lock for the shared resource, and when the write lock allocation identifier indicates that the write lock has been allocated, an identifier of the second client is stored in a memory address of a queue head of the write lock request queue. The write lock request queue in the memory of the lock server records a client that obtains the write lock, and because the write lock has been allocated, and the client in the read lock request queue is in a read lock waiting state, the lock server records information about the client that obtains the write lock, and also records information about the client in the read lock waiting state.

With reference to the third aspect, in a fourth possible implementation manner, the multiple clients further include a third client, and an identifier of the third client is stored in a memory address of a queue head of the read lock request queue, and the first memory address, which is carried in the first read lock request, in the read lock request queue is a memory address which is in a sequence from the queue head to a queue tail of the read lock request queue and into which the identifier of the first client can be written. The read lock request queue in the memory of the lock server may record multiple clients. Therefore, the lock server may confirm a read lock status of multiple clients, that is, whether the multiple clients are in a read lock waiting state or obtain a read lock. Optionally, the first memory address is a first memory address which is in the sequence from the queue head to the queue tail of the read lock request queue and into which the identifier of the first client can be written.

With reference to the third aspect, in a fifth possible implementation manner, the first read lock request further carries a lock lease, where the lock lease is used to indicate a validity period of a read lock, and when the lock lease expires, the lock server may release the read lock in time.

With reference to the second possible implementation manner of the third aspect, in a sixth possible implementation manner, the method further includes receiving, by the interface card, a read lock release request sent by the first client, where the read lock release request carries the first memory address which is in the read lock request queue and in which the identifier of the first client is stored, decreasing, by the interface card, the read lock allocation count in the memory according to the quantity of read locks allocated to the first client, and deleting, by the interface card, the identifier of the first client from the first memory address in the read lock request queue. The first client releases the read lock such that the lock server may allocate the write lock.

Optionally, the first client sends a read lock release request according to a notification of another client that applies for the write lock.

With reference to the second possible implementation manner of the third aspect, in a seventh possible implementation manner, when the first client becomes faulty after obtaining the read lock, the method further includes decreasing, by the interface card, the read lock allocation count in the memory according to the quantity of read locks allocated to the first client, and deleting, by the interface card, the identifier of the first client from the first memory address in the read lock request queue. When the first client becomes faulty after obtaining the read lock, the interface card of the lock server releases the read lock of the first client to prevent the faulty client from holding the read lock for a long time. Optionally, the interface card may determine, according to a notification of another client, that the first client is faulty, and then release the read lock held by the first client.

According to a fourth aspect, an embodiment of the present disclosure provides another lock management method in a cluster, where the cluster includes multiple clients and a lock server, the lock server includes an interface card and a memory, and the memory stores a read lock request queue and a write lock allocation identifier, the read lock request queue is used to record an identifier of a client that is in the cluster and that is in a read lock waiting state or obtains a read lock for a same shared resource, and the write lock allocation identifier is used to indicate whether a write lock for the shared resource is allocated, and the lock management method includes sending, by a first client in the multiple clients, a first read lock request to the interface card, where the first read lock request carries an identifier of the first client and a first memory address in the read lock request queue, and receiving, by the first client, a first message sent by the interface card, where the first message carries the write lock allocation identifier.

With reference to the fourth aspect, in a first possible implementation manner, when the write lock allocation identifier indicates that the write lock has been allocated, the first message indicates that the first client is in a read lock waiting state.

With reference to the fourth aspect, in a second possible implementation manner, when the write lock allocation identifier indicates that the write lock is not allocated, the first message indicates that the first client obtains a read lock.

With reference to the fourth aspect, in a third possible implementation manner, the cluster further includes a second client, and an identifier of the second client is stored in a memory address of a queue head of the read lock request queue, and the first memory address, which is carried in the first read lock request, in the read lock request queue is a memory address which is in a sequence from the queue head to a queue tail of the read lock request queue and into which the identifier of the first client can be written. Optionally, the first memory address is a first memory address which is in the sequence from the queue head to the queue tail of the read lock request queue and into which the identifier of the first client can be written.

With reference to the fourth aspect, in a fourth possible implementation manner, the first read lock request further carries a lock lease, where the lock lease is used to indicate a validity period of a read lock.

With reference to the second possible implementation manner of the fourth aspect, in a fifth possible implementation manner, when the first client obtains the read lock, the method further includes sending, by the first client, a read lock release request to the interface card, where the read lock release request carries the memory address which is in the read lock request queue and in which the identifier of the first client is stored. Optionally, the first client receives a notification sent by another client that applies for the write lock, and performs a read lock release operation.

According to a fifth aspect, an embodiment of the present disclosure provides another lock management method in a cluster, where the cluster includes a lock server, a first client, and a second client, the lock server includes an interface card and a memory, and the memory stores a write lock request queue and a write lock allocation identifier, an identifier of the first client is stored in a memory address of a queue head of the write lock request queue, the write lock request queue further stores an identifier of the second client, the write lock allocation identifier indicates that a write lock has been allocated, the first client obtains the write lock for a shared resource, and the second client is in a write lock waiting state for the shared resource, and the lock management method includes receiving, by the interface card, a write lock release request of the first client, where the write lock release request carries the memory address of the queue head of the write lock request queue, deleting, by the interface card, the identifier of the first client from the write lock request queue according to the memory address of the queue head of the write lock request queue, receiving, by the interface card, a write lock request query message sent by the first client, where the write lock request query message carries a memory address which is in the write lock request queue and in which the identifier of the second client is stored, sending, by the interface card, a write lock request query response message to the first client, where the write lock request query response message carries the identifier of the second client, receiving, by the interface card, a write lock occupation request sent by the first client, where the write lock occupation request carries the identifier of the second client and the memory address of the queue head of the write lock request queue, and writing, by the interface card, the identifier of the second client into the memory address of the queue head of the write lock request queue. In this embodiment of the present disclosure, when the first client releases the write lock, the write lock is directly allocated to a client that is in a write lock waiting state and that is recorded in the write lock request queue.

With reference to the fifth aspect, in a first possible implementation manner, the memory address which is in the write lock request queue and in which the identifier of the second client is stored is a next memory address following the queue head of the write lock request queue. Therefore, the client whose identifier is stored in the next memory address following the queue head of the write lock request queue preferentially obtains the write lock.

With reference to the fifth aspect, in a second possible implementation manner, the write lock request queue further stores a write lock priority of the second client, where the write lock priority of the second client is the highest among clients that are in a write lock waiting state and that are recorded in the write lock request queue. Therefore, the client with the highest write lock priority among the clients that are in the write lock waiting state and that are recorded in the write lock request queue preferentially obtains the write lock.

According to a sixth aspect, an embodiment of the present disclosure provides another lock management method in a cluster, where the cluster includes a lock server, a first client, and a second client, the lock server includes an interface card and a memory, and the memory stores a write lock request queue, a read lock request queue, a read lock allocation count, and a write lock allocation identifier, an identifier of the first client is stored in a memory address of a queue head of the write lock request queue, the read lock request queue stores an identifier of the second client, the write lock allocation identifier indicates that a write lock has been allocated, the read lock allocation count is 0, the first client obtains the write lock for a shared resource, and the second client is in a read lock waiting state for the shared resource, and the lock management method includes receiving, by the interface card, a write lock release request sent by the first client, where the write lock release request carries the memory address of the queue head of the write lock request queue, setting, by the interface card, the write lock allocation identifier to a write lock unallocated state, deleting, by the interface card, the identifier of the first client from the write lock request queue according to the memory address of the queue head of the write lock request queue, receiving, by the interface card, a read lock request query message sent by the first client, sending, by the interface card, a read lock request query response message to the first client, where the read lock request query response message carries the identifier of the second client, receiving, by the interface card, a read lock allocation count modification request sent by the first client, and increasing, by the interface card, the read lock allocation count in the memory according to the read lock allocation count modification request. When the write lock of the first client is released, a read lock is directly allocated to a client that is in a read lock waiting state and that is recorded in the read lock request queue.

According to a seventh aspect, an embodiment of the present disclosure provides another lock management method in a cluster, where the cluster includes a lock server, a first client, and a second client, the lock server includes an interface card and a memory, and the memory stores a write lock request queue and a write lock allocation identifier, an identifier of the first client is stored in a memory address of a queue head of the write lock request queue, the write lock request queue further stores an identifier of the second client, the write lock allocation identifier indicates that a write lock has been allocated, the first client obtains the write lock for a shared resource, and the second client is in a write lock waiting state for the shared resource, and the lock management method includes sending, by the first client, a write lock release request to the interface card, where the write lock release request carries the memory address of the queue head of the write lock request queue, when the interface card deletes the identifier of the first client from the write lock request queue according to the memory address of the queue head of the write lock request queue, sending, by the first client, a write lock request query message to the interface card, where the write lock request query message carries a memory address which is in the write lock request queue and in which the identifier of the second client is stored, receiving, by the first client, a write lock request query response message sent by the interface card, where the write lock request query response message carries the identifier of the second client, sending, by the first client, a write lock occupation request to the interface card, where the write lock occupation request carries the identifier of the second client and the memory address of the queue head of the write lock request queue, receiving, by the first client, a write lock occupation request response sent by the interface card, indicating that the identifier of the second client is written into the memory address of the queue head of the write lock request queue, and sending, by the first client, a notification to the second client, where the notification indicates that the second client obtains the write lock. When the first client releases the write lock, the write lock is directly allocated to a client that is in a write lock waiting state and that is recorded in the write lock request queue.

With reference to the seventh aspect, in a first possible implementation manner, the memory address which is in the write lock request queue and in which the identifier of the second client is stored is a next memory address following the queue head of the write lock request queue. Therefore, the client whose identifier is stored in the next memory address following the queue head of the write lock request queue preferentially obtains the write lock.

With reference to the seventh aspect, in a second possible implementation manner, the write lock request queue further stores a write lock priority of the second client, where the write lock priority of the second client is the highest among clients that are in a write lock waiting state and that are recorded in the write lock request queue. Therefore, the client with the highest write lock priority among the clients that are in the write lock waiting state and that are recorded in the write lock request queue preferentially obtains the write lock.

According to an eighth aspect, an embodiment of the present disclosure provides another lock management method in a cluster, where the cluster includes a lock server, a first client, and a second client, the lock server includes an interface card and a memory, and the memory stores a write lock request queue, a read lock request queue, a read lock allocation count, and a write lock allocation identifier, an identifier of the first client is stored in a memory address of a queue head of the write lock request queue, the read lock request queue stores an identifier of the second client, the write lock allocation identifier indicates that a write lock has been allocated, the read lock allocation count is 0, the first client obtains the write lock for a shared resource, and the second client is in a read lock waiting state for the shared resource, and the lock management method includes sending, by the first client, a write lock release request to the interface card, where the write lock release request carries the memory address of the queue head of the write lock request queue, sending, by the first client, a read lock request query message to the interface card when the interface card sets the write lock allocation identifier to a write lock unallocated state and deletes the identifier of the first client from the write lock request queue according to the memory address of the queue head of the write lock request queue, receiving, by the first client, a read lock request query response message sent by the interface card, where the read lock request query response message carries the identifier of the second client, and sending, by the first client, a read lock allocation count modification request to the interface card. When the first client releases the write lock, a read lock is directly allocated to a client that is in a read lock waiting state and that is recorded in the read lock request queue.

According to a ninth aspect, an embodiment of the present disclosure provides another lock management method in a cluster, where the cluster includes a lock server, a first client, and a second client, the lock server includes an interface card and a memory, and the memory stores a write lock request queue and a write lock allocation identifier, an identifier of the first client is stored in a memory address of a queue head of the write lock request queue, the write lock request queue further stores an identifier of the second client, the write lock allocation identifier indicates that a write lock has been allocated, the first client obtains the write lock for a shared resource, and the second client is in a write lock waiting state for the shared resource, and the lock management method includes sending, by the first client, a write lock release request to the interface card, where the write lock release request carries the memory address of the queue head of the write lock request queue, sending, by the first client, a write lock request query message to the interface card when the interface card sets the write lock allocation identifier to a write lock unallocated state and deletes the identifier of the first client from the write lock request queue according to the memory address of the queue head of the write lock request queue, where the write lock request query message carries a memory address which is in the write lock request queue and in which the identifier of the second client is stored, receiving, by the first client, a write lock request query response message sent by the interface card, where the write lock request query response message carries the identifier of the second client, and sending, by the first client, a notification to the second client according to the identifier of the second client, where the notification is used to instruct the second client to send a write lock request to the interface card. When releasing the write lock, the first client instructs a client in a write lock waiting state to send a write lock request.

With reference to the ninth aspect, in a first possible implementation manner, the memory address which is in the write lock request queue and in which the identifier of the second client is stored is a next memory address following the queue head of the write lock request queue. The client whose identifier is stored in the next memory address following the queue head of the write lock request queue preferentially obtains a write lock request notification sent by the first client.

With reference to the ninth aspect, in a second possible implementation manner, the write lock request queue further stores a write lock priority of the second client, where the write lock priority of the second client is the highest among clients that are in a write lock waiting state and that are recorded in the write lock request queue. Therefore, the client with the highest write lock priority among the clients that are in the write lock waiting state and that are recorded in the write lock request queue preferentially obtains a write lock request notification sent by the first client.

According to a tenth aspect, an embodiment of the present disclosure provides another lock management method in a cluster, where the cluster includes a lock server, a first client, and a second client, the lock server includes an interface card and a memory, and the memory stores a write lock request queue, a read lock request queue, a read lock allocation count, and a write lock allocation identifier, an identifier of the first client is stored in a memory address of a queue head of the write lock request queue, the read lock request queue stores an identifier of the second client, the write lock allocation identifier indicates that a write lock has been allocated, the read lock allocation count is 0, the first client obtains the write lock for a shared resource, and the second client is in a read lock waiting state for the shared resource, and the lock management method includes sending, by the first client, a write lock release request to the interface card, where the write lock release request carries the memory address of the queue head of the write lock request queue, sending, by the first client, a read lock request query message to the interface card when the interface card sets the write lock allocation identifier to a write lock unallocated state and deletes the identifier of the first client from the write lock request queue according to the memory address of the queue head of the write lock request queue, receiving, by the first client, a read lock request query response message sent by the interface card, where the read lock request query response message carries the identifier of the second client, and sending, by the first client, a notification to the second client according to the identifier of the second client, where the notification is used to instruct the second client to apply for a read lock. When releasing the write lock, the first client instructs the second client in a read lock waiting state to apply for a read lock, the second client sends a read lock allocation count modification request to the interface card, the interface card modifies the read lock allocation count, and the second client obtains a read lock.

According to an eleventh aspect, an embodiment of the present disclosure provides another lock management method in a cluster, where the cluster includes a lock server, a first client, and a second client, the lock server includes an interface card and a memory, and the memory stores a write lock request queue, a read lock request queue, a read lock allocation count, and a write lock allocation identifier, the read lock request queue stores an identifier of the first client, an identifier of the second client is stored in a memory address of a queue head of the write lock request queue, the write lock allocation identifier indicates that a write lock is not allocated, the read lock allocation count is a quantity of read locks obtained by the first client, the first client obtains a read lock for a shared resource, and the second client is in a write lock waiting state for the shared resource, and the lock management method includes sending, by the first client, a read lock release request to the interface card, where the read lock release request carries a memory address which is in the read lock request queue and in which the identifier of the first client is stored, when the interface card decreases the read lock allocation count to 0 and deletes the identifier of the first client from the read lock request queue according to the memory address which is in the read lock request queue and in which the identifier of the first client is stored, sending, by the first client, a write lock request query message to the interface card, where the write lock request query message carries the memory address of the queue head of the write lock request queue, receiving, by the first client, a write lock request query response message sent by the interface card, where the write lock request query response message carries the identifier of the second client, and sending, by the first client, a notification to the second client according to the identifier of the second client, where the notification is used to instruct the second client to apply for the write lock. When releasing the read lock, the first client instructs the second client that is in a write lock waiting state and whose identifier is recorded in the queue head of the write lock request queue to apply for the write lock, the second client sends a write lock allocation identifier modification request to the interface card according to the notification, the interface card sets the write lock allocation identifier to a write lock allocated state, and the second client obtains the write lock.

According to a twelfth aspect, an embodiment of the present disclosure provides another lock management method in a cluster, where the cluster includes a lock server, a first client, and a second client, the lock server includes an interface card and a memory, and the memory stores a write lock request queue, a read lock request queue, a read lock allocation count, and a write lock allocation identifier, the read lock request queue stores an identifier of the first client, an identifier of the second client is stored in a memory address of a queue head of the write lock request queue, the write lock allocation identifier indicates that a write lock is not allocated, the read lock allocation count is a quantity of read locks obtained by the first client, the first client obtains a read lock for a shared resource, and the second client is in a write lock waiting state for the shared resource, and the lock management method includes sending, by the first client, a read lock release request to the interface card, where the read lock release request carries a memory address which is in the read lock request queue and in which the identifier of the first client is stored, sending, by the first client, a write lock request query message to the interface card when the interface card decreases the read lock allocation count in the memory to 0 and deletes the identifier of the first client from the read lock request queue according to the memory address which is in the read lock request queue and in which the identifier of the first client is stored, where the write lock request query message carries the memory address of the queue head of the write lock request queue, receiving, by the first client, a write lock request query response message sent by the interface card, where the write lock request query response message carries the identifier of the second client, sending, by the first client, a write lock allocation identifier modification request to the interface card, and sending, by the first client, a notification to the second client according to the identifier of the second client when the interface card sets the write lock allocation identifier to a write lock allocated state according to the write lock allocation identifier modification request, where the notification indicates that the second client obtains the write lock. When the first client releases the read lock, the write lock is directly allocated to the second client that is in a write lock waiting state and whose identifier is recorded in the queue head of the write lock request queue.

According to a thirteenth aspect, an embodiment of the present disclosure provides another lock management method in a cluster, where the cluster includes a lock server, a first client, and a second client, the lock server includes an interface card and a memory, and the memory stores a write lock request queue, a read lock request queue, a read lock allocation count, and a write lock allocation identifier, the read lock request queue stores an identifier of the first client, an identifier of the second client is stored in a memory address of a queue head of the write lock request queue, the write lock allocation identifier indicates that a write lock is not allocated, the read lock allocation count is a quantity of read locks obtained by the first client, the first client obtains a read lock for a shared resource, and the second client is in a write lock waiting state for the shared resource, and the lock management method includes receiving, by the interface card, a read lock release request sent by the first client, where the read lock release request carries a memory address which is in the read lock request queue and in which the identifier of the first client is stored, decreasing, by the interface card, the read lock allocation count to 0 and deleting the identifier of the first client from the read lock request queue according to the memory address which is in the read lock request queue and in which the identifier of the first client is stored, receiving, by the interface card, a write lock request query message sent by the first client, where the write lock request query message carries the memory address of the queue head of the write lock request queue, and sending, by the interface card, a write lock request query response message to the first client, where the write lock request query response message carries the identifier of the second client. When the read lock of the first client is released, the interface card queries for the second client that is in a write lock waiting state and whose identifier is recorded in the queue head of the write lock request queue to preferentially process the write lock.

According to a fourteenth aspect, an embodiment of the present disclosure provides another lock management method in a cluster, where the cluster includes a lock server, a first client, and a second client, the lock server includes an interface card and a memory, and the memory stores a write lock request queue, a read lock request queue, a read lock allocation count, and a write lock allocation identifier, the read lock request queue stores an identifier of the first client, an identifier of the second client is stored in a memory address of a queue head of the write lock request queue, the write lock allocation identifier indicates that a write lock is not allocated, the read lock allocation count is a quantity of read locks obtained by the first client, the first client obtains a read lock for a shared resource, and the second client is in a write lock waiting state for the shared resource, and the lock management method includes receiving, by the interface card, a read lock release request sent by the first client, where the read lock release request carries a memory address which is in the read lock request queue and in which the identifier of the first client is stored, decreasing, by the interface card, the read lock allocation count to 0 and deleting the identifier of the first client from the read lock request queue according to the memory address which is in the read lock request queue and in which the identifier of the first client is stored, receiving, by the interface card, a write lock request query message sent by the first client, where the write lock request query message carries the memory address of the queue head of the write lock request queue, sending, by the interface card, a write lock request query response message to the first client, where the write lock request query response message carries the identifier of the second client, and receiving, by the interface card, a write lock allocation identifier modification request sent by the first client, and setting, by the interface card, the write lock allocation identifier to a write lock allocated state according to the write lock allocation identifier modification request. When the read lock of the first client is released, the write lock is directly allocated to a client that is in a write lock waiting state and that is recorded in the queue head of the write lock request queue.

According to a fifteenth aspect, an embodiment of the present disclosure provides another lock management method in a cluster, where the cluster includes a lock server, a first client, and a second client, the lock server includes an interface card and a memory, and the memory stores a write lock request queue and a write lock allocation identifier, an identifier of the first client is stored in a memory address of a queue head of the write lock request queue, an identifier of the second client is further stored in a next memory address following the queue head of the write lock request queue, the write lock allocation identifier indicates that a write lock has been allocated, the first client obtains the write lock for a shared resource, and the second client is in a write lock waiting state for the shared resource, and the lock management method includes receiving, by the interface card, a write lock release request of the first client, where the write lock release request carries the memory address of the queue head of the write lock request queue, deleting, by the interface card, the identifier of the first client from the write lock request queue according to the memory address of the queue head of the write lock request queue, querying, by the interface card, for the identifier of the second client stored in the next memory address following the queue head of the write lock request queue, writing, by the interface card, the identifier of the second client into the memory address of the queue head of the write lock request queue, and sending, by the interface card, a notification to the second client, to instruct the second client to obtain the write lock. In this embodiment of the present disclosure, when the first client releases the write lock, the lock server allocates the write lock to a client that is in a write lock waiting state and that is recorded in the write lock request queue.

According to a sixteenth aspect, an embodiment of the present disclosure provides another lock management method in a cluster, where the cluster includes a lock server, a first client, and a second client, the lock server includes an interface card and a memory, and the memory stores a write lock request queue, a read lock request queue, a read lock allocation count, and a write lock allocation identifier, an identifier of the first client is stored in a memory address of a queue head of the write lock request queue, the read lock request queue stores an identifier of the second client, the write lock allocation identifier indicates that a write lock has been allocated, the read lock allocation count is 0, the first client obtains the write lock for a shared resource, and the second client is in a read lock waiting state for the shared resource, and the lock management method includes receiving, by the interface card, a write lock release request sent by the first client, where the write lock release request carries the memory address of the queue head of the write lock request queue, setting, by the interface card, the write lock allocation identifier to a write lock unallocated state, deleting, by the interface card, the identifier of the first client from the write lock request queue according to the memory address of the queue head of the write lock request queue, querying, by the interface card, the read lock request queue to determine the identifier of the second client stored in the read lock request queue, increasing, by the interface card, the read lock allocation count in the memory, and sending, by the interface card, a notification to the second client to indicate that the second client obtains a read lock. When the write lock of the first client is released, the lock server directly allocates a read lock to a client that is in a read lock waiting state and that is recorded in the read lock request queue.

According to a seventeenth aspect, an embodiment of the present disclosure provides another lock management method in a cluster, where the cluster includes a lock server, a first client, and a second client, the lock server includes an interface card and a memory, the memory stores a write lock request queue, a read lock request queue, a read lock allocation count, and a write lock allocation identifier, the read lock request queue stores an identifier of the first client, an identifier of the second client is stored in a memory address of a queue head of the write lock request queue, the write lock allocation identifier indicates that a write lock is not allocated, the read lock allocation count is a quantity of read locks obtained by the first client, the first client obtains a read lock for a shared resource, and the second client is in a write lock waiting state for the shared resource, and the lock management method includes receiving, by the interface card, a read lock release request sent by the first client, where the read lock release request carries a memory address which is in the read lock request queue and in which the identifier of the first client is stored, decreasing, by the interface card, the read lock allocation count to 0 and deleting the identifier of the first client from the read lock request queue according to the memory address which is in the read lock request queue and in which the identifier of the first client is stored, querying, by the interface card, the memory address of the queue head of the write lock request queue to determine the identifier of the second client, and sending, by the interface card, a notification to the second client according to the identifier of the second client, to instruct the second client to apply to the interface card for the write lock. When the read lock of the first client is released, the interface card queries for the second client that is in a write lock waiting state and whose identifier is recorded in the queue head of the write lock request queue, to preferentially process the write lock.

According to an eighteenth aspect, an embodiment of the present disclosure provides another lock management method in a cluster, where the cluster includes a lock server, a first client, and a second client, the lock server includes an interface card and a memory, and the memory stores a write lock request queue, a read lock request queue, a read lock allocation count, and a write lock allocation identifier, the read lock request queue stores an identifier of the first client, an identifier of the second client is stored in a memory address of a queue head of the write lock request queue, the write lock allocation identifier indicates that a write lock is not allocated, the read lock allocation count is a quantity of read locks obtained by the first client, the first client obtains a read lock for a shared resource, and the second client is in a write lock waiting state for the shared resource, and the lock management method includes receiving, by the interface card, a read lock release request sent by the first client, where the read lock release request carries a memory address which is in the read lock request queue and in which the identifier of the first client is stored, decreasing, by the interface card, the read lock allocation count to 0 and deleting the identifier of the first client from the read lock request queue according to the memory address which is in the read lock request queue and in which the identifier of the first client is stored, querying, by the interface card, the memory address of the queue head of the write lock request queue to determine the identifier of the second client, and setting, by the interface card, the write lock allocation identifier to a write lock allocated state, and sending, by the interface card, a notification to the second client according to the identifier of the second client, to indicate that the second client obtains the write lock. When the read lock of the first client is released, the write lock is allocated to a client that is in a write lock waiting state and that is recorded in the queue head of the write lock request queue.

According to the foregoing embodiments, an embodiment of the present disclosure further provides a lock server, where the lock server includes a memory and an interface card, which are configured to implement functions of the lock server in the foregoing embodiments.

According to the foregoing embodiments, an embodiment of the present disclosure further provides a client, which is configured to serve as the first client in a cluster described in the foregoing embodiments, to implement solutions corresponding to the foregoing embodiments of the present disclosure. The client includes structural units for implementing the functions of the first client in the cluster in the foregoing embodiments of the present disclosure, or implements the functions of the first client in the cluster in the foregoing embodiments of the present disclosure. Correspondingly, an embodiment of the present disclosure further provides a non-volatile computer readable storage medium and a computer program product. When a computer instruction included in the non-volatile computer readable storage medium and the computer program product is loaded into a memory of the client, and a central processing unit (CPU) of the client executes the computer instruction, the client implements the functions of the first client in the cluster in the foregoing embodiments of the present disclosure.

With reference to the foregoing embodiments, an embodiment of the present disclosure further provides a cluster, where the cluster includes a lock server and a client, and for the lock server and the client, reference may be made to the description of the foregoing embodiments.

According to the lock management method in a cluster, the lock server, and the client in a cluster that are provided in the embodiments of the present disclosure, when the lock server and the client process operations such as a read lock request, a write lock request, a write lock release request, and a read lock release request, an interface card and a memory of the lock server directly communicate with each other, and a CPU of the lock server does not need to process the foregoing operations. Therefore, compared with communication using the transmission control protocol (TCP)/Internet protocol (IP), interactions between the client and the lock server are reduced.

DESCRIPTION OF EMBODIMENTS

Figure 1:
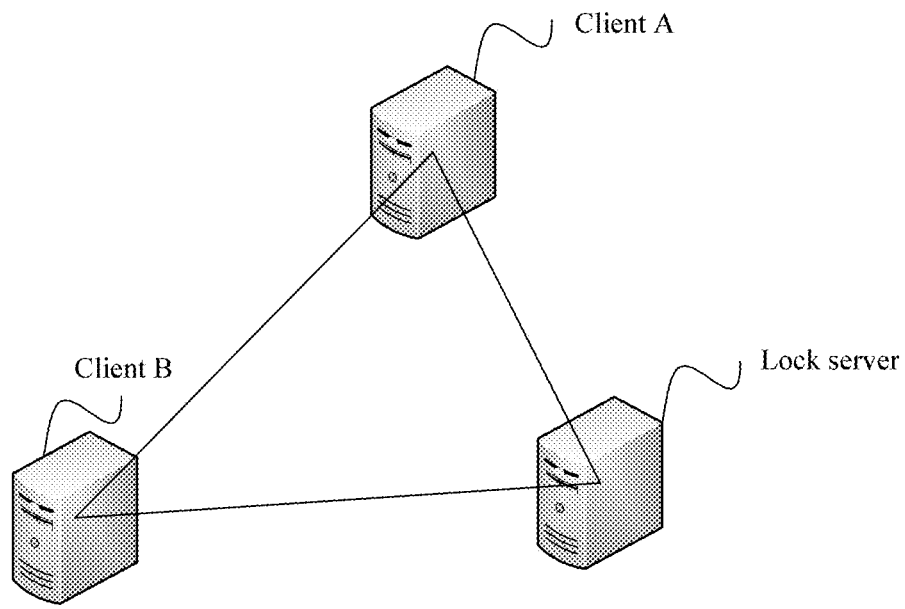
FIG. 1 is a structural diagram of a cluster.
Figure 2:
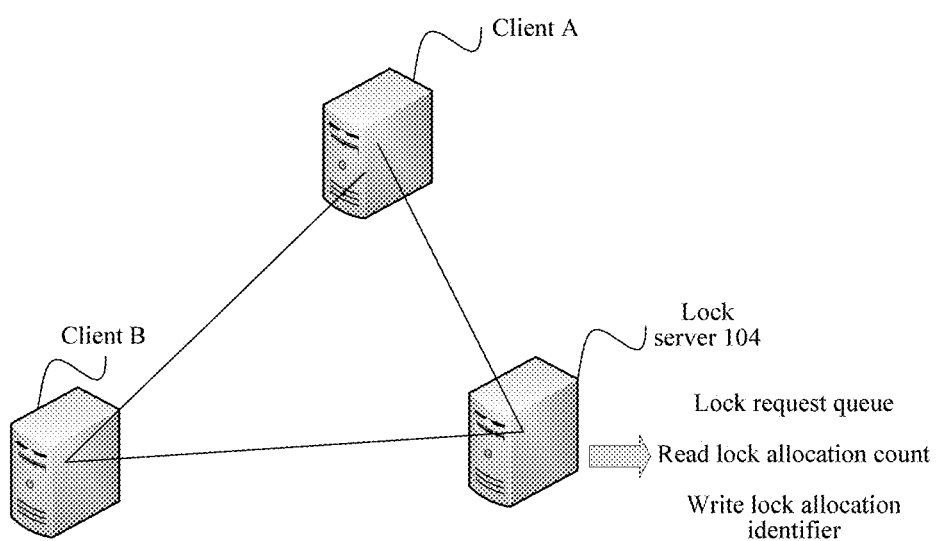
FIG. 2 is a structural diagram of a cluster according to an embodiment of the present disclosure.

As shown in FIG. 2, a cluster in an embodiment of the present disclosure includes a lock server 104, a client A, and a client B. The client A and the client B separately communicate with the lock server 104 using the RDMA protocol, where a memory of the lock server 104 stores a lock request queue, a read lock allocation count, and a write lock allocation identifier. For details, reference may be made to the following description.

Figure 3:
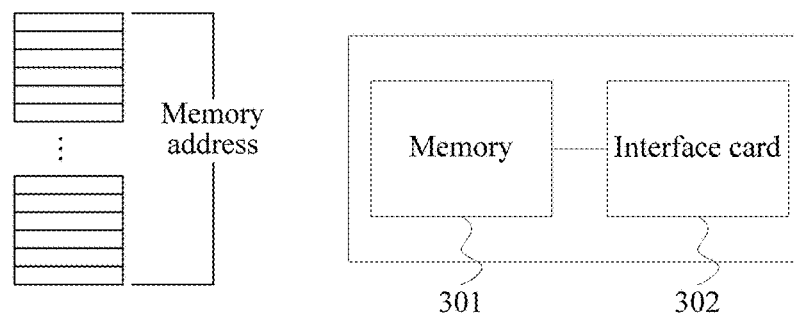
FIG. 3 is a structural diagram of a lock server according to an embodiment of the present disclosure.
Figure 4:
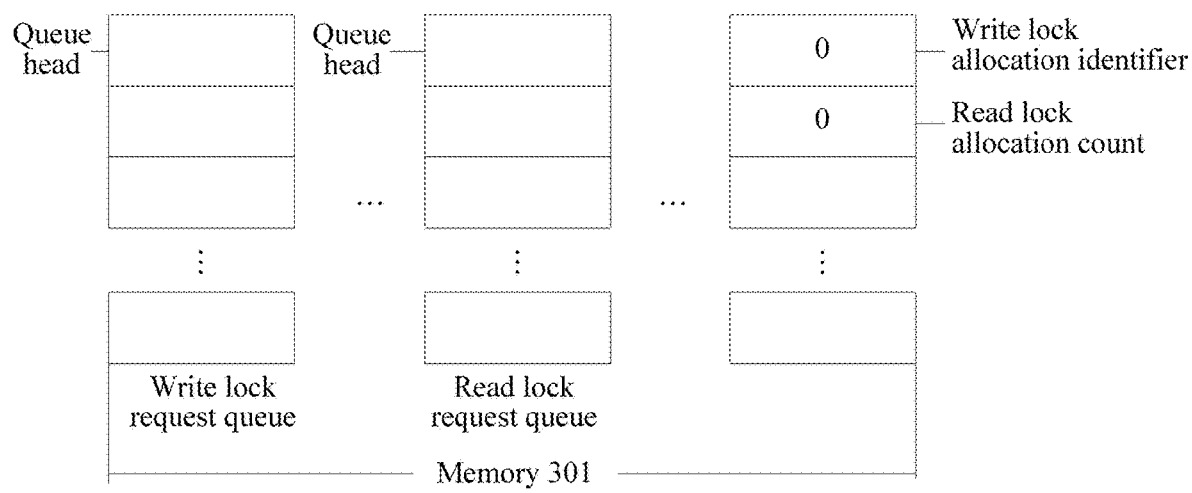
FIG. 4 is a schematic diagram of a memory of a lock server according to an embodiment of the present disclosure.

According to the cluster shown in FIG. 2, as shown in FIG. 3, the lock server 104 includes a memory 301 and an interface card 302, where the interface card 302 may be a network interface card (NIC) that supports the Ethernet protocol, or an InfiniBand protocol-based interface card, or another interface card capable of implementing a protocol that can implement direct remote access to a memory, for example, RDMA. The memory 301 in this embodiment of the present disclosure may be a dynamic random access memory (DRAM), a dual in-line memory module (DIMM), a semiconductor memory (SCM), a non-volatile memory (NVM), or the like, or may be a combination thereof, which is not limited in this embodiment of the present disclosure. The client may be a server, a personal computer, and another terminal. The client generally includes a CPU and a memory. The client generally further includes an interface card configured to communicate with the lock server 104. The CPU, the memory, and the interface card communicate with each other using a bus. According to the cluster shown in FIG. 2, as shown in FIG. 4, in this embodiment of the present disclosure, the lock request queue in the memory 301 of the lock server 104 is a write lock request queue. In another implementation, the lock request queue in the memory 301 of the lock server 104 is a read lock request queue. In another implementation, the lock request queue in the memory 301 of the lock server 104 is a write lock request queue and a read lock request queue.

In this embodiment of the present disclosure, the write lock request queue and the read lock request queue are data structures in the memory 301, where the write lock request queue is used to store an identifier of a client that is in a write lock waiting state or obtains a write lock, and the read lock request queue is used to store an identifier of a client that is in a read lock waiting state or obtains a read lock. In this embodiment of the present disclosure, the described write lock request queue and read lock request queue store an identifier of a client requesting a same shared resource, where requesting a same shared resource refers to applying for a write lock or a read lock for a same shared resource. That is, the write lock request queue is used to record identifiers of clients in the cluster, including an identifier of a client that is in a write lock waiting state for a shared resource and an identifier of a client that obtains a write lock for the same shared resource, and the read lock request queue is used to record an identifier of a client that is in the cluster and that is in a read lock waiting state or obtains a read lock for a same shared resource. The write lock allocation identifier is used to identify whether a write lock for a same shared resource is allocated, and the read lock allocation count is used to identify a corresponding quantity of read locks allocated for a same shared resource. In a specific implementation of the read lock allocation count of the memory 301, one memory address may be allocated to record a quantity of read locks allocated by the lock server 104, or multiple memory addresses are used, where each memory address records a quantity, which is recorded in the read lock request queue, of read locks obtained by a client. In a specific implementation of this embodiment of the present disclosure, the write lock request queue is a data structure in the memory 301, and the read lock request queue is a data structure in the memory 301. During a specific implementation, the write lock request queue and the read lock request queue each may be an array or another structure.

In this embodiment of the present disclosure, that an identifier of a client is stored in a memory address in the write lock request queue and that an identifier of a client is recorded in the write lock request queue have a same meaning. Likewise, that an identifier of a client is stored in a memory address in the read lock request queue and that an identifier of a client is recorded in the read lock request queue have a same meaning. That the write lock allocation identifier is used to identifier whether a write lock is allocated for a same shared resource and that the write lock allocation identifier is used to indicate whether a write lock is allocated have a same meaning. In this embodiment of the present disclosure, the cluster includes multiple clients, and a client in the multiple clients has a same meaning as a client included in the multiple clients. For example, a second client in multiple clients has a same meaning as a second client included in multiple clients.

During a specific implementation, the lock server 104 communicates with each client using the interface card 302, sends a memory address of a queue head of the write lock request queue and length information of the write lock request queue to each client, and likewise, sends a memory address of a queue head of the read lock request queue and length information of the read lock request queue to each client, and sends information about a memory address of the write lock allocation identifier and information about a memory address of the read lock allocation count to each client.

The client A and the client B communicate with the lock server 104 using the RDMA protocol. The clients communicate with the lock server 104 using the RDMA protocol, and compared with performing communication using the TCP/IP protocol, interactions between the clients and the lock server 104 are reduced.

Figure 5:
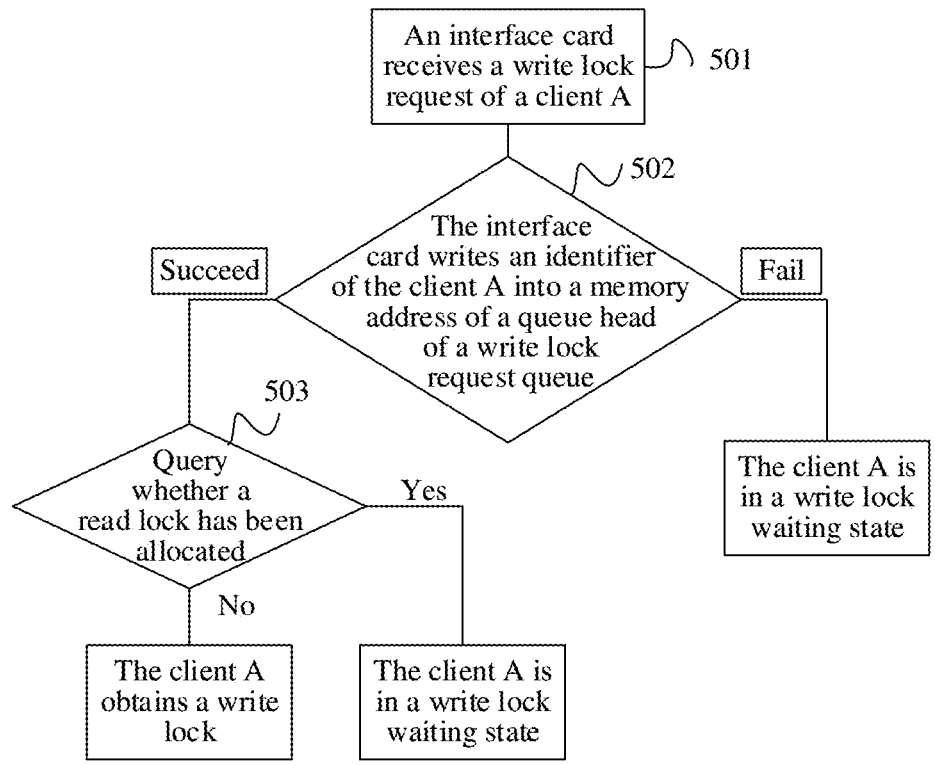
FIG. 5 is a flowchart of requesting a write lock according to an embodiment of the present disclosure.

According to the cluster shown in FIG. 2, as shown in FIG. 5, an embodiment of the present disclosure provides a process of requesting a write lock by a client.

Step 501: An interface card receives a write lock request of a client A.

The client A sends the write lock request to a lock server, where the write lock request carries an identifier of the client A and a memory address of a queue head of a write lock request queue.

The write lock request queue in the memory 301 may be used to record identifiers of clients, including an identifier of a client in a write lock waiting state and an identifier of a client that obtains a write lock, and the lock server may determine, according to the write lock request queue, write lock application statuses of the clients in a cluster.

Step 502: The interface card writes an identifier of the client A into a memory address of a queue head of a write lock request queue.

Figure 6:
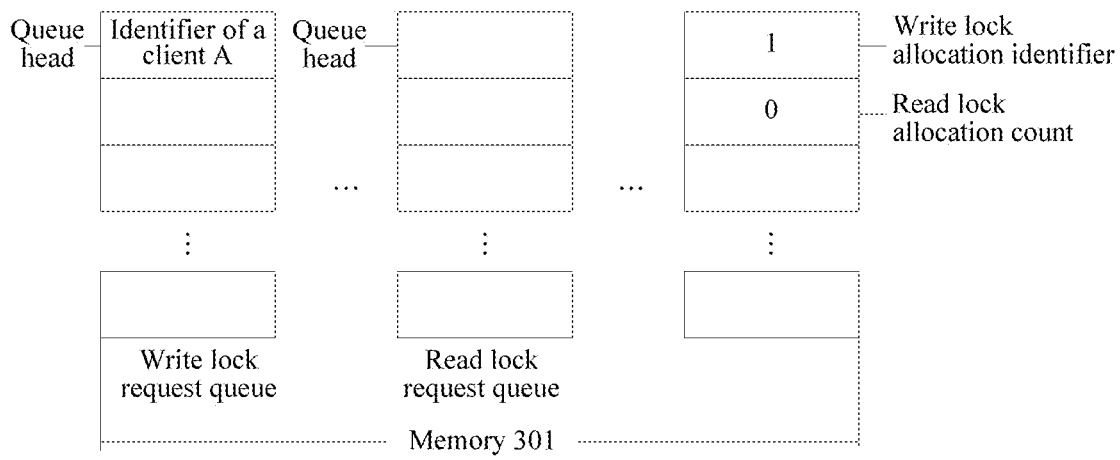
FIG. 6 is a schematic diagram of a memory of a lock server according to an embodiment of the present disclosure.

The interface card 302 of the lock server receives the write lock request, and writes the identifier of the client A into the queue head of the write lock request queue according to the memory address, which is carried in the write lock request, of the queue head of the write lock request queue, as shown in FIG. 6.

If the identifier of the client A is written into the queue head of the write lock request queue successfully, it indicates that the lock server does not allocate the write lock to any client in the cluster, and no client is waiting for the write lock. Optionally, the interface card 302 returns a message to the client A to indicate that the identifier of the client A is written into the memory address of the queue head of the write lock request queue.

Optionally, if the interface card 302 fails in writing the identifier of the client A into the queue head of the write lock request queue, the interface card 302 sends a message to the client A to indicate that the identifier of the client A fails to be written into the queue head of the write lock request queue. In this case, the client A may send a write lock request to the interface card 302 again, where the write lock request carries the identifier of the client A and a next memory address following the memory address of the queue head of the write lock request queue, and the interface card 302 writes the identifier of the client A into the next memory address in the write lock request queue. When the identifier of the client A fails to be written into the next memory address in the write lock request queue, the client A sequentially selects a third memory address starting from the queue head of the write lock request queue, and repeats the foregoing operation. The client A sends the write lock request to the interface card 302 again, where the write lock request carries the identifier of the client A and the third memory address in the write lock request queue, until the identifier of the client A is written into a memory address in the write lock request queue successfully, that is, the write lock request carries a memory address which is in the write lock request queue and into which the identifier of the client A can be written. The client A may send a write lock request at intervals of a fixed period, or may send a write lock request when receiving a message indicating that the identifier of the client A fails to be written into the write lock request queue.

Optionally, if the interface card 302 fails in writing the identifier of the client A into the queue head of the write lock request queue, the interface card 302 queries, starting from the queue head of the write lock request queue, the write lock request queue sequentially for a memory address into which the identifier of the client A can be written, and writes the identifier of the client A into the write lock request queue, and the interface card 302 sends a message to the client A to indicate that the identifier of the client A is written into the memory address in the write lock request queue. Optionally, the message may carry the memory address which is in the write lock request queue and in which the identifier of the client A is stored.

Step 503: Query whether a read lock has been allocated.

In this embodiment of the present disclosure, an example is used, in which a write lock allocation identifier being 0 indicates that the lock server does not allocate the write lock, and a write lock allocation identifier being 1 indicates that the lock server has allocated the write lock.

Optionally, if the interface card 302 writes the identifier of the client A into the queue head of write lock request queue successfully, the interface card 302 queries the read lock allocation count to determine whether a read lock has been allocated. When the lock server does not allocate a read lock, the write lock allocation identifier is set to a write lock allocated state (set to 1 in this embodiment of the present disclosure) according to the memory address of the write lock allocation identifier, and the interface card 302 sends a message to the client A to indicate that the client A obtains the write lock. Exemplarily, the message may carry the write lock allocation identifier and the read lock allocation count, where the write lock allocation identifier is 1, and the read lock allocation count is 0. The read lock allocation count being 0 indicates that no read lock is allocated.

Optionally, if the interface card 302 writes the identifier of the client A into the queue head of the write lock request queue successfully, the interface card 302 sends a message to the client A to indicate that the identifier of the client A is written into the queue head of the write lock request queue, the client A sends a write lock allocation identifier modification request to the interface card 302, where the write lock allocation identifier modification request carries the memory address of the write lock allocation identifier, and the interface card 302 queries the read lock allocation count to determine whether the lock server has allocated a read lock, when the lock server does not allocate a read lock, the write lock allocation identifier is set to a write lock allocated state (set to 1 in this embodiment of the present disclosure) according to the memory address of the write lock allocation identifier, and the interface card 302 sends a message to the client A to indicate that the client A obtains the write lock. Further, the message may carry the write lock allocation identifier and the read lock allocation count, where the write lock allocation identifier is 1, and the read lock allocation count is 0.

If the interface card 302 determines, after querying the read lock allocation count, that the lock server does not allocate a read lock, the interface card 302 sets the write lock allocation identifier to a write lock allocated state, that is, sets the write lock allocation identifier to 1 to indicate that the client A obtains the write lock successfully. That is, the write lock is allocated to the client A successfully. If the interface card 302 determines, after querying the read lock allocation count, that the lock server has allocated a read lock, the interface card 302 does not set the write lock allocation identifier to 1, that is, the write lock allocation identifier is still in a write lock unallocated state (where in this embodiment of the present disclosure, the write lock allocation identifier is 0 in this case), the client A is in a write lock waiting state, and the interface card 302 sends a message to the client A to indicate that the client A is in the write lock waiting state. Exemplarily, the message may carry the write lock allocation identifier and the read lock allocation count, where the write lock allocation identifier is 0, and the read lock allocation count is not 0. The read lock allocation count being not 0 indicates that a read lock has been allocated.

In this embodiment of the present disclosure, the interface card 302 queries the read lock allocation count and determines that the lock server does not allocate a read lock (the read lock allocation count is 0), and the interface card 302 sets the write lock allocation identifier to 1.

In the cluster, when the lock server has allocated a read lock, that is, a shared resource that the client A needs to modify is being read by another client in the cluster, a write permission cannot be allocated to the client A, that is, a write lock cannot be allocated. Therefore, when the identifier of the client A is written into the queue head of the write lock request queue, whether the lock server has allocated a read lock needs to be determined. When the interface card 302 obtains, by querying, that the lock server does not allocate a read lock, a client in the queue head of the write lock request queue obtains the write lock, that is, the client A obtains the write lock. When the interface card 302 obtains, by querying, that the lock server has allocated a read lock, the client A waits for the write lock.

When the interface card 302 fails in writing the identifier of the client A into the queue head of the write lock request queue according to the memory address, which is carried in the write lock request sent by the client A, of the queue head of the write lock request queue, the write lock request queue is queried sequentially starting from the queue head of the write lock request queue, to find a memory address into which the identifier of the client A can be written, and the identifier of the client A is written into the write lock request queue. The queue head of the write lock request queue records a client that applies for a write lock first, and one write lock can be allocated to only one client. Therefore, when the client of the queue head of the write lock request queue has obtained the write lock or is waiting for the write lock, the identifier of the client A fails to be written into the queue head of the write lock request queue.

Figure 7:
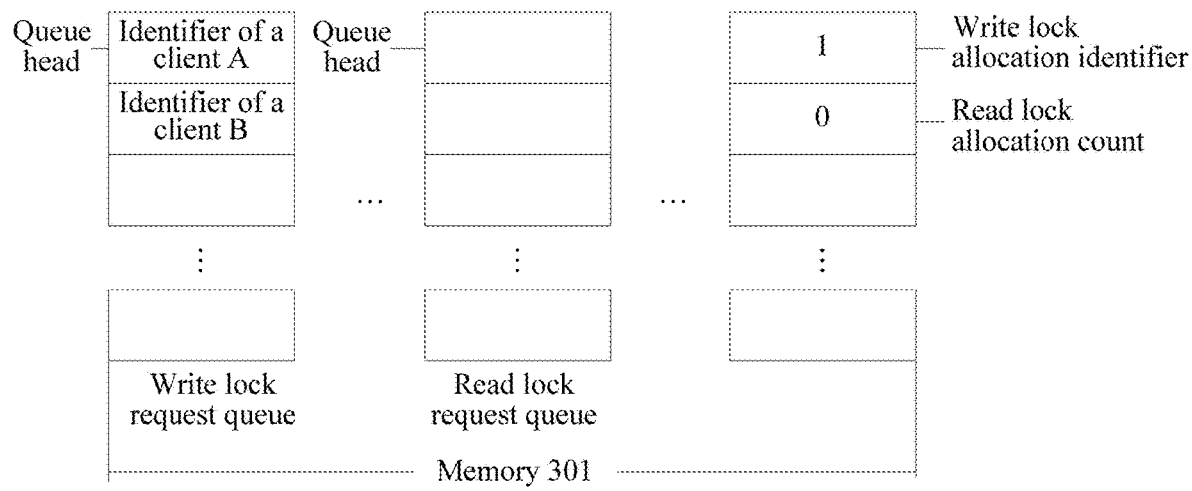
FIG. 7 is a schematic diagram of a memory of a lock server according to an embodiment of the present disclosure.

In this embodiment of the present disclosure, an example is used, in which the identifier of the client A is written into the queue head of the write lock request queue successfully, and the read lock allocation count in the memory 301 records that no read lock is allocated, that is, the client A obtains the write lock. On this basis, in another embodiment, the interface card 302 of the lock server receives a write lock request sent by the client B, where the write lock request sent by the client B carries an identifier of the client B and the memory address of the queue head of the write lock request queue. Because the identifier of the client A has been written into the queue head of the write lock request queue, the interface card 302 fails in writing the identifier of the client B into the queue head of the write lock request queue. Optionally, the interface card 302 sends a message to the client B to indicate that the identifier of the client B fails to be written into the queue head of the write lock request queue. The interface card 302 writes the identifier of the client B into a next memory address following the queue head of the write lock request queue, that is, starting from the queue head of the write lock request queue, the write lock request of the client B is in a second place of the write lock request queue, as shown in FIG. 7. For a specific manner of writing the identifier of the client B into the next memory address following the queue head of the write lock request queue, reference may be made to the foregoing description of writing the identifier of the client A into the write lock request queue, and details are not described herein. Optionally, the interface card 302 queries the write lock request queue for a memory address which is in a sequence from the queue head to a queue tail of the write lock request queue and into which the identifier of the client can be written, and sends a notification to the client B to notify the client B of the memory address into which the identifier of the client can be written. Optionally, the memory address into which the identifier of the client can be written may be a first memory address which is in the sequence from the queue head to the queue tail of the write lock request queue and into which the identifier of the client can be written.

In this case, the write lock allocation identifier in the memory 301 is set to a write lock allocated state (set to 1 in this embodiment of the present disclosure), that is, the write lock is allocated to the client A in the queue head of the write lock request queue, and the client B is in a write lock waiting state. The interface card 302 no longer modifies the write lock allocation identifier in the memory 301. Optionally, the interface card 302 sends a message to the client B to indicate that the client B is in a write lock waiting state. Further, the message may carry the memory address which is in the write lock request queue and in which the identifier of the client B is stored. The client B determines, according to the memory address, that the client B is in the write lock waiting state. Therefore, the lock server determines write lock request statuses of the clients in the cluster in this case, that is, the write lock is allocated to the client A, and the client B is in the write lock waiting state. That the write lock is allocated to the client A is also referred to as that the client A holds the write lock, and the client A is a holder of the write lock. Optionally, the write lock request sent by the client to the lock server may further carry a write lock lease, that is, a valid time of the write lock held by the client, and if the client has not updated the lease when the valid time expires, the write lock becomes invalid automatically.

Figure 8:
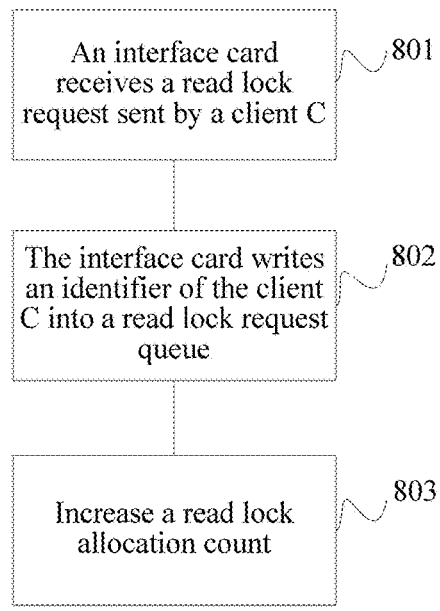
FIG. 8 is a flowchart of requesting a read lock according to an embodiment of the present disclosure.

According to the cluster shown in FIG. 2, as shown in FIG. 8, an embodiment of the present disclosure further provides a process of requesting a read lock by a client. In this embodiment of the present disclosure, a lock server further includes a read lock request queue. For a description about a write lock request queue in this embodiment of the present disclosure, reference may be made to the foregoing description.

The read lock request queue is used to store an identifier of a client that is in a read lock waiting state or obtains a read lock. Therefore, the lock server may determine, according to the read lock request queue, read lock application statuses of clients in a cluster. A quantity of read locks that have been allocated may be determined according to a read lock allocation count.

Step 801: An interface card receives a read lock request sent by a client C.

In this embodiment of the present disclosure, a memory 301 further includes a read lock request queue, and a cluster further includes the client C. The interface card 302 of a lock server receives the read lock request sent by the client C, where the read lock request carries an identifier of the client C and a memory address of a queue head of the read lock request queue.

Step 802: The interface card 302 writes an identifier of the client C into a read lock request queue.

Figure 9:
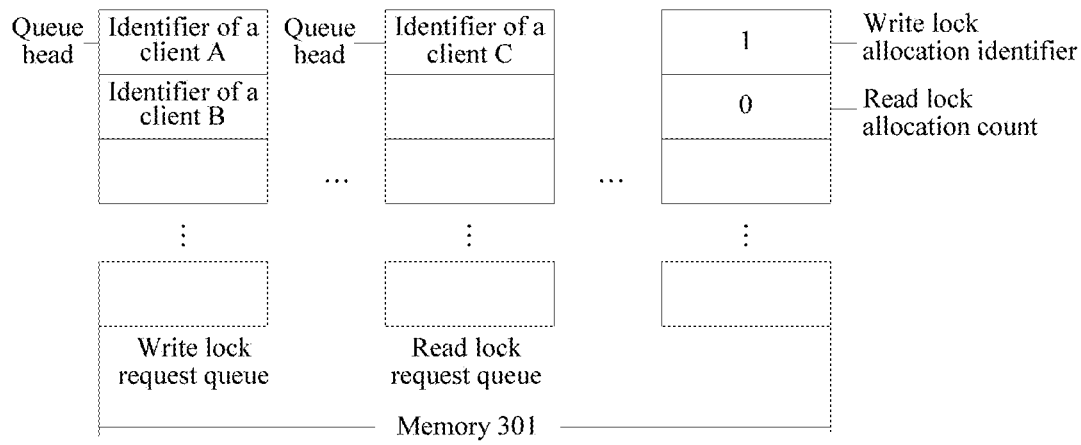
FIG. 9 is a schematic diagram of a memory of a lock server according to an embodiment of the present disclosure.

Further, the interface card 302 writes the identifier of the client C into the memory address of the queue head of the read lock request queue, and when no identifier of another client in the cluster is written into the memory address of the queue head of the read lock request queue, the identifier of the client C is successfully written into the memory address of the queue head of the read lock request queue, as shown in FIG. 9. Optionally, the interface card 302 sends a message to a client A to indicate that the identifier of the client C is written into the memory address of the queue head of the read lock request queue.

When an identifier of another client in the cluster is written into the memory address of the queue head of the read lock request queue, the identifier of the client C fails to be written into the memory address of the queue head of the read lock request queue. Optionally, the interface card 302 sends a message to the client C to indicate that the identifier of the client C fails to be written into the queue head of the read lock request queue. In this case, the client C may send a read lock request to the interface card 302 again, where the read lock request carries the identifier of the client C and a next memory address following the queue head of the read lock request queue, and the interface card 302 writes the identifier of the client C into the next memory address following the queue head of the read lock request queue. When the identifier of the client C fails to be written into the next memory address following the queue head of the read lock request queue, the previous operation is repeated, and the client C sends the read lock request to the interface card 302 again, where the read lock request carries the identifier of the client C and a third memory address starting from the queue head of the read lock request queue, until the identifier of the client C is written into a memory address in the read lock request queue successfully, that is, the read lock request carries the memory address into which the identifier of the client C can be written. The client C may send a read lock request periodically, or may send a read lock request when receiving a message indicating that the identifier of the client C fails to be written into the read lock request queue. Optionally, the interface card 302 queries the read lock request queue for a memory address which is in a sequence from the queue head to a queue tail of the read lock request queue and into which the identifier of the client can be written, and sends a notification to a client C to notify the client C of the memory address into which the identifier of the client can be written. Optionally, the memory address into which the identifier of the client can be written is a first memory address which is in the sequence from the queue head to the queue tail of the read lock request queue and into which the identifier of the client can be written.

Optionally, if the interface card 302 fails in writing the identifier of the client C into the queue head of the read lock request queue, the interface card 302 queries, starting from the queue head of the read lock request queue, the read lock request queue sequentially for a memory address into which the identifier of the client C can be written, and writes the identifier of the client C into the read lock request queue, and the interface card 302 sends a message to the client C to indicate that the identifier of the client C is written into the memory address in the read lock request queue. Optionally, the message may carry the memory address which is in the read lock request queue and in which the identifier of the client C is stored.

A shared resource in the cluster may be read by multiple clients at the same time. Therefore, the read lock may be shared by the multiple clients, that is, the multiple clients may hold the read lock at the same time. In this case, the multiple clients are holders of the read lock at the same time. Therefore, in the read lock allocation count, a count may be used to indicate whether the lock server has allocated a read lock. For example, when the read lock allocation count is 0, it indicates that the lock server does not allocate a read lock. Each time the lock server allocates a read lock, the read lock allocation count is increased by 1. Therefore, in a case in which the lock server does not allocate a write lock (in this embodiment of the present disclosure, a write lock allocation identifier is 0), the client may obtain a read lock.

Step 803: Increase a read lock allocation count.

Optionally, when the interface card 302 writes the identifier of the client C into the read lock request queue, the interface card 302 increases the read lock allocation count by 1, and the interface card 302 returns the write lock allocation identifier and the read lock allocation count to the client C. Further, when the write lock allocation identifier is 1, the client C sends a read lock allocation count modification request to the interface card 302, and the interface card 302 decreases the read lock allocation count by 1 according to the read lock allocation count modification request.

Optionally, when the interface card 302 writes the identifier of the client C into the read lock request queue, and when the write lock allocation identifier is 1, the interface card 302 sends a message to the client C to indicate that the client C is in a read lock waiting state. Further, the message may carry the write lock allocation identifier, and the client C determines that the client C is in a read lock waiting state according to the write lock allocation identifier.

It can be known from the foregoing description that, no matter the message sent by the interface card 302 to the client C indicates that the client C obtains the read lock or is in a read lock waiting state, it indicates that the identifier of the client C is written into the memory address in the read lock request queue.

Optionally, when the interface card 302 writes the identifier of the client C into the read lock request queue, and when the write lock allocation identifier is 0, the interface card 302 increases the read lock allocation count by 1. Further, the interface card 302 sends a message to the client C to indicate that client C obtains the read lock. For example, the message carries the write lock allocation identifier, where the write lock allocation identifier is 0. Optionally, in a case in which the lock server has allocated the write lock (the write lock allocation identifier is 1), the client in the read lock request queue is in a read lock waiting state, and the read lock allocation count is not increased. Further, the interface card 302 sends a message to the client C to indicate that the client C is in a read lock waiting state. For example, the message carries the write lock allocation identifier, where the write lock allocation identifier is 1.

In this embodiment of the present disclosure, an example is used, in which the interface card 302 writes the identifier of the client C into the memory address of the queue head of the read lock request queue successfully. In this case, no client in the cluster obtains the read lock or is in a read lock waiting state, and the write lock allocation identifier records that the write lock has been allocated (the write lock allocation identifier is 1). In this case, the client C is in a read lock waiting state. Optionally, the read lock request sent by the client C to the lock server may further carry a read lock lease, that is, a valid time of the read lock held by the client C, and if the client C has not updated the lease when the valid time expires, the read lock becomes invalid automatically.

Figure 10:
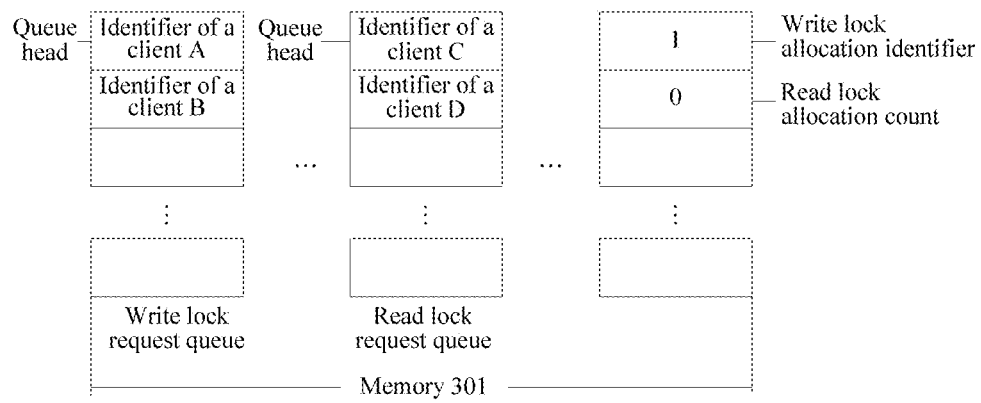
FIG. 10 is a schematic diagram of a memory of a lock server according to an embodiment of the present disclosure.

In this embodiment of the present disclosure, the cluster further includes a client D, and the interface card 302 of the lock server receives a read lock request sent by the client D. The read lock request sent by the client D carries an identifier of the client D and the memory address of the queue head of the read lock request queue. Because the identifier of the client C has been stored in the memory address of the queue head of the read lock request queue, the interface card 302 writes the identifier of the client D into a next memory address following the queue head of the read lock request queue, as shown in FIG. 10. For a specific solution, reference may be made to the description of writing the identifier of the client C into the read lock request queue, and details are not described herein. Because the client A holds the write lock (the write lock allocation identifier is 1), the client C is in a read lock waiting state, and the client D is also in a read lock waiting state.

In this embodiment of the present disclosure, a client sends a lock request to the interface card 302 of the lock server using the RDMA protocol, and the memory 301 of the lock server records lock statuses of clients in the cluster. The lock server records statuses of all locks, and the lock server can determine a status of a client, such as a normal state or a faulty state. Therefore, when a client that holds a lock becomes faulty, the lock held by the faulty client may be released in time. Optionally, that the lock server determines a status of a client includes determining a status of a client by means of heartbeat detection between the lock server and the client. Optionally, heartbeat detection is performed between clients to determine statuses of the clients, and a client in a normal state reports information about a faulty client to the lock server. The lock server releases, according to the information about the faulty client, a lock held by the faulty client. Optionally, when the faulty client holds a write lock, the interface card 302 of the lock server sets the write lock allocation identifier in the memory 301 to 0, and deletes an identifier of the faulty client from the queue head of the write lock request queue, and when the faulty client holds a read lock, the interface card 302 of the lock server decreases the read lock allocation count in the memory 301 by 1, and deletes the identifier of the faulty client from the read lock request queue. Optionally, another normal client may also execute the foregoing operation of the lock server, to release the lock held by the faulty client. For example, another normal client sends a lock release request to the interface card 302, where the lock release request carries the identifier of the faulty client, and the interface card 302 executes the foregoing lock release operation. Optionally, after the interface card 302 of the lock server releases the write lock held by the faulty client, the interface card 302 sends a notification to another client, where the notification indicates that the write lock held by the faulty client has been released. Likewise, after the interface card 302 of the lock server releases the read lock held by the faulty client, the interface card 302 sends a notification to another client, where the notification indicates that the read lock held by the faulty client has been released.

In this embodiment of the present disclosure, the client A holds the write lock, and an operation of releasing the write lock is further included. The client A sends a write lock release request to the interface card 302, where the write lock release request carries the memory address of the queue head of the write lock request queue. Optionally, the interface card 302 deletes the identifier of the client A from the memory address of the queue head of the write lock request queue, and the interface card 302 sets the write lock allocation identifier to a write lock unallocated state (that is, changing from 1 to 0). Optionally, the interface card 302 deletes the identifier of the client A from the memory address of the queue head of the write lock request queue, the interface card 302 notifies the client A that the identifier of the client A is deleted, the client A sends a write lock allocation identifier modification request to the interface card 302, and the interface card 302 sets the write lock allocation identifier to a write lock unallocated state (that is, changing from 1 to 0).

Optionally, when the client A releases the write lock, the method further includes sending, by the client A, a write lock request query message to the interface card 302, where the write lock request query message carries a next memory address following the queue head of the write lock request queue, querying, by the interface card 302, for the identifier of the client B stored in the next memory address following the queue head of the write lock request queue, sending, by the interface card 302, a write lock request query response message to the client A, where the write lock request query response message carries the identifier of the client B, sending, by the client A, a notification to the client B according to the identifier of the client B carried in the write lock request query response message to instruct the client B to apply for the write lock, and sending, by the client B, a write lock request to the interface card 302 according to the notification of the client A. For details, reference may be made to the foregoing description of sending a write lock request by a client, and details are not described herein. Therefore, the write lock may be applied for according to a sequence, starting from the queue head of the write lock request queue, of a client in a write lock waiting state. Optionally, after the client A releases the write lock, the interface card 302 of the lock server queries for the identifier of the client B stored in the next memory address following the queue head of the write lock request queue, the interface card 302 sends a notification to the client B to instruct the client B to apply for the write lock, and the client B sends a write lock request message to the interface card 302 according to the notification sent by the interface card 302.

Optionally, in the foregoing embodiment, the write lock request sent by the client to the interface card 302 further carries a write lock priority of the client, the write lock request queue stores an identifier and a write lock priority of a client, and when the client A releases the write lock, the method further includes sending, by the client A, a write lock request query message to the interface card 302, and sending, by the interface card 302, a write lock request query response message to the client A, where the query response message carries an identifier and a write lock priority, which are recorded in the write lock request queue, of a client in a write lock waiting state. In this embodiment of the present disclosure, that the client B has a highest write lock priority is used as an example. The client A determines a client with a highest write lock priority according to the write lock request query response message, and the client A sends a notification to the client B to instruct the client B to send a write lock request to the interface card 302. For details, reference may be made to the foregoing description of sending a write lock request by a client, and details are not described herein. Therefore, the write lock may be applied for according to a write lock priority of a client in a write lock waiting state. Optionally, in the foregoing embodiment, the write lock request sent by the client to the interface card 302 further carries the write lock priority of the client, and the write lock request queue stores the identifier and the write lock priority of the client. After the client A releases the write lock, the interface card 302 of the lock server queries the write lock priority, which is recorded in the write lock request queue, of the client in the write lock waiting state, to determine a client with a highest write lock priority, for example, the client B. The interface card 302 sends a notification to the client B, to instruct the client B to apply for the write lock, and the client B sends a write lock request message to the interface card 302 according to the notification sent by the interface card 302.

Optionally, if the write lock request queue records that multiple clients are in a write lock waiting state, when the client A releases the write lock, the method further includes sending, by the client A, a write lock request query message to the interface card 302, querying, by the interface card 302, the write lock request queue to determine clients in a write lock waiting state, sending, by the interface card 302, a write lock request query response message to the client A, where the write lock request query response message carries identifiers of the clients in the write lock waiting state, and sending, by the client A, a notification to at least two clients in the clients in the write lock waiting state according to the write lock request query response message, to instruct the clients to send a write lock request to the interface card 302. Therefore, the clients in the write lock waiting state that are recorded in the write lock request queue have a same opportunity to obtain the write lock. Optionally, when the client A releases the write lock, the method further includes querying, by the interface card 302, the write lock request queue to determine clients in a write lock waiting state, and sending, by the interface card 302, a notification to at least two clients in the clients in the write lock waiting state to instruct the at least two clients to send a write lock request to the interface card 302.

Optionally, if the read lock request queue stores identifiers of the clients C and D, that is, the clients C and D are in a read lock waiting state, when the client A releases the write lock, the method further includes sending, by the client A, a read lock request query message to the interface card 302, querying, by the interface card 302, the read lock request queue to determine the clients C and D that are in the read lock waiting state, and sending, by the interface card 302, a read lock request query response message to the client A, where the read lock request query response message carries the identifiers of the clients C and D in the read lock waiting state. Optionally, the client A sends a notification to the clients C and D in the read lock waiting state according to the read lock request query response message, to instruct the clients C and D to apply for a read lock, the clients C and D separately send a read lock allocation count modification request to the interface card 302, and the interface card 302 increases the read lock allocation count according to the read lock allocation count modification request of the clients C and D. Optionally, the client A sends a notification to the client C in the read lock waiting state according to the read lock request query response message such that the client C applies for a read lock. The client C sends a read lock allocation count modification request to the interface card 302, and the interface card 302 increases the read lock allocation count according to the read lock allocation count modification request of the client C. Therefore, all the clients in a read lock waiting state that are recorded in the read lock request queue may obtain a read lock. Optionally, when the client A releases the write lock, the method further includes querying, by the interface card 302, the read lock request queue to determine the clients C and D that are in the read lock waiting state, sending, by the interface card 302, a notification to the clients C and D in the read lock waiting state, to instruct the clients C and D to apply for a read lock such that the clients C and D separately send a read lock allocation count modification request to the interface card 302, and increasing, by the interface card 302, the read lock allocation count according to the read lock allocation count modification request of the clients C and D.

Optionally, when the client A releases the write lock, the method further includes sending, by the client A, a write lock release request to the interface card 302, where the write lock release request carries the memory address of the queue head of the write lock request queue, and deleting, by the interface card 302, the identifier of the client A from the memory address of the queue head of the write lock request queue. The client A sends a write lock request query message to the interface card 302, where the write lock request query message carries a next memory address following the queue head of the write lock request queue. The interface card 302 queries for the identifier of the client B stored in the next memory address following the queue head of the write lock request queue. The interface card 302 sends a write lock request query response message to the client A, where the write lock request query response message carries the identifier of the client B. The client A sends a write lock occupation request to the interface card 302 according to the write lock request query response message, where the write lock occupation request carries the memory address of the queue head of the write lock request queue and the identifier of the client B. The interface card 302 writes the identifier of the client B into the memory address of the queue head of the write lock request queue. The interface card 302 sends a write lock occupation request response message to the client A to indicate that the identifier of the client B is written into the memory address of the queue head of the write lock request queue. The client A sends a notification to the client B according to the write lock occupation request response message, to indicate that the client B obtains the write lock. Therefore, it can be ensured that the client, waiting for the write lock, recorded in the next memory address following the queue head of the write lock request queue can obtain the write lock. Optionally, when the client A releases the write lock, the method further includes querying, by the interface card 302, the identifier of the client B stored in the next memory address following the queue head of the write lock request queue, writing, by the interface card 302, the identifier of the client B into the memory address of the queue head of the write lock request queue, and sending, by the interface card 302, a notification to the client B to indicate that the client B obtains the write lock.

Optionally, the write lock request sent by the client to the interface card 302 further carries a write lock priority of the client, where the write lock request queue stores the identifier and the write lock priority of the client, and when the client A releases the write lock, the method further includes sending, by the client A, a write lock release request to the interface card 302, where the write lock release request carries the memory address of the queue head of the write lock request queue, and deleting, by the interface card 302, the identifier of the client A from the memory address of the queue head of the write lock request queue. The client A sends a write lock request query message to the interface card 302, and the interface card 302 sends a write lock request query response message to the client A, where the write lock request response message carries an identifier and a write lock priority, which are recorded in the write lock request queue, of a client in a write lock waiting state. In this embodiment of the present disclosure, that the client B has a highest write lock priority is used as an example. The client A sends a write lock occupation request to the interface card 302 according to the write lock request query response message, where the write lock occupation request carries the memory address of the queue head of the write lock request queue and the identifier of the client B. The interface card 302 writes the identifier of the client B into the memory address of the queue head of the write lock request queue. The interface card 302 sends a write lock occupation request response message to the client A to indicate that the identifier of the client B is written into the memory address of the queue head of the write lock request queue. The client A sends a notification to the client B according to the write lock occupation request response message to indicate that the client B obtains the write lock. Optionally, the write lock request sent by the client to the interface card 302 further carries a write lock priority of the client, where the write lock request queue stores the identifier and the write lock priority of the client. When the client A releases the write lock, the interface card 302 queries for an identifier and a write lock priority, which are recorded in the write lock request queue, of a client in a write lock waiting state. In this embodiment of the present disclosure, that the client B has a highest write lock priority is used as an example. The interface card 302 writes the identifier of the client B into the memory address of the queue head of the write lock request queue, and the interface card 302 sends a notification to the client B, to indicate that the client B obtains the write lock.

Optionally, the write lock request queue records identifiers of multiple clients that are in a write lock waiting state, and when the client A releases the write lock, the method further includes sending, by the client A, a write lock release request to the interface card 302, where the write lock release request carries the memory address of the queue head of the write lock request queue, and deleting, by the interface card 302, the identifier of the client A from the memory address of the queue head of the write lock request queue. The client A sends a write lock request query message to the interface card 302. The interface card 302 sends a write lock request query response message to the client A, where the write lock request response message carries identifiers, which are recorded in the write lock request queue, of the clients in the write lock waiting state. The client A randomly determines a client, for example, the client B, according to the write lock request query response message, and sends a write lock occupation request to the interface card 302, where the write lock occupation request carries the memory address of the queue head of the write lock request queue and the identifier of the client B. The interface card 302 writes the identifier of the client B into the memory address of the queue head of the write lock request queue. The interface card 302 sends a write lock occupation request response message to the client A to indicate that the identifier of the client B is written into the memory address of the queue head of the write lock request queue. The client A sends a notification to the client B according to the write lock occupation request response message, to indicate that the client B obtains the write lock. Optionally, when the client A releases the write lock, the method further includes querying, by the interface card 302, for the identifiers, which are recorded in the write lock request queue, of the clients in the write lock waiting state, randomly determining, by the interface card 302, a client, for example, the client B, from the clients in the write lock waiting state, writing, by the interface card 302, the identifier of the client B into the memory address of the queue head of the write lock request queue, and sending, by the interface card 302, a notification to the client B, to indicate that the client B obtains the write lock.

Optionally, if the read lock request queue stores identifiers of the clients C and D, when the client A releases the write lock, the method further includes sending, by the client A, a read lock request query message to the interface card 302, querying, by the interface card 302, the read lock request queue to determine the clients C and D that are in a read lock waiting state, sending, by the interface card 302, a read lock request query response message to the client A, where the read lock request query response message carries the identifiers of the clients C and D in the read lock waiting state, and sending, by the client A, a read lock allocation count modification request to the interface card 302 according to the read lock request query response message, where the read lock allocation count modification request carries a quantity of allocated read locks. Optionally, the quantity of allocated read locks is 2, and the interface card 302 increases the read lock allocation count according to the quantity of allocated read locks. The interface card 302 returns a read lock allocation count modification request response to the client A, and the client A sends a notification to the clients C and D. Optionally, the quantity of allocated read locks is 1, and the interface card 302 increases the read lock allocation count according to the quantity of allocated read locks. The interface card 302 returns a read lock allocation count modification request response to the client A, and the client A instructs the client C or D to obtain a read lock. Optionally, if the read lock request queue stores the identifiers of the clients C and D, when the client A releases the write lock, the method further includes querying, by the interface card 302, the read lock request queue to determine the clients C and D that are in the read lock waiting state, increasing, by the interface card 302, the read lock allocation count according to a quantity of read locks allocated to the clients C and D, and sending, by the interface card 302, a notification to the client C or D to indicate that a read lock is obtained.

Optionally, when the clients C and D that obtain the read lock release the read lock, the client C sends a read lock release request to the interface card 302, where the read lock release request carries the identifier of the client C and the memory address which is in the read lock request queue and in which the identifier of the client C is stored. The interface card 302 deletes the identifier of the client C from the read lock request queue, and decreases the read lock allocation count. Likewise, the client D releases the read lock, and referring to the foregoing operation, the read lock allocation count is decreased to 0. The client D further sends a write lock request query message to the interface card 302, where the write lock request query message carries the memory address of the queue head of the write lock request queue. The interface card 302 returns a write lock request query response message to the client D, where the write lock request query response message carries an identifier of a client stored in the memory address of the queue head of the write lock request queue, and the client D instructs, according to the identifier of the client, the client to apply to the interface card 302 for the write lock. That the client applies to the interface card 302 for the write lock includes sending, by the client, a write lock allocation identifier modification request to the interface card 302, and setting, by the interface card 302, the write lock allocation identifier to 1. Optionally, when the clients C and D that obtain the read lock release the read lock, the interface card 302 queries an identifier of a client stored in the memory address of the queue head of the write lock request queue, and the interface card 302 instructs, according to the identifier of the client, the client to apply to the interface card 302 for the write lock.

Optionally, when the clients C and D that obtain the read lock release the read lock, the client C sends a read lock release request to the interface card 302, where the read lock release request carries the identifier of the client C and the memory address which is in the read lock request queue and in which the identifier of the client C is stored. The interface card 302 deletes the identifier of the client C from the read lock request queue, and decreases the read lock allocation count. Likewise, the client D releases the read lock, and referring to the foregoing operation, the read lock allocation count is decreased to 0. The client D sends a write lock allocation identifier modification request to the interface card 302. The interface card 302 modifies the write lock allocation identifier to be a write lock allocated state (set to 1 in this embodiment of the present disclosure). The interface card 302 returns a write lock allocation identifier modification request response to the client D, where the write lock allocation identifier modification request response carries an identifier of a client stored in the memory address of the queue head of the write lock request queue. The client D instructs, according to the identifier of the client, the client to obtain the write lock. Optionally, when the clients C and D that obtain the read lock release the read lock, the interface card 302 modifies the write lock allocation identifier to be a write lock allocated state (set to 1 in this embodiment of the present disclosure), and the interface card 302 queries an identifier of a client stored in the memory address of the queue head of the write lock request queue, to instruct the client to obtain the write lock.

Optionally, this embodiment of the present disclosure further provides a read lock recall policy. In this embodiment of the present disclosure, the cluster further includes a client E. When the client E sends a write lock request to the interface card 302, where for a specific operation, reference may be made to the foregoing operation of sending a write lock request by the client B, the client E is in a write lock waiting state, the clients C and D hold the read lock, and the client E instructs the clients C and D to release the read lock. The client C sends a read lock release request to the interface card 302. For a specific operation, reference may be made to the foregoing operation of releasing the read lock by the client C. The client D sends a read lock release request to the interface card 302. For a specific operation, reference may be made to the foregoing operation of releasing the read lock by the client C. After the read lock held by the clients C and D is released, the read lock allocation count in the memory 301 is 0. Optionally, the interface card 302 sends a message to the client E to instruct the client E to apply for the write lock. Optionally, the interface card 302 sends a message to the client D to indicate that the read lock of the client D is released successfully, and the client D sends a message to the client E to instruct the client E to apply for the write lock.

In the foregoing embodiments of the present disclosure, an example in which a client applies for one read lock each time is used for description. During client read lock application, when clients apply for multiple read locks, the interface card 302 increases the read lock allocation count in the memory 301 according to a quantity of read locks that are applied for, and identifiers of multiple clients are recorded in the read lock request queue. During read lock releasing, the read lock allocation count in the memory 301 is decreased according to the quantity of read locks that are applied for, and the identifiers of the multiple clients are deleted from the read lock request queue. A client may send a write lock request using an atomic operation Compare-and-Swap in the RDMA protocol, and the client may send a read lock request using an atomic operation Fetch-and-Add in the RDMA protocol.

In this embodiment of the present disclosure, the client sends, to the interface card 302, a query message such as a write lock request query message or a read lock request query message, where the query message may carry multiple to-be-queried memory addresses at a time, such as memory addresses in a write lock request queue or memory addresses in a read lock request queue, or the query message may carry one to-be-queried memory address at a time, where query is completed using multiple query messages.

Figure 11:
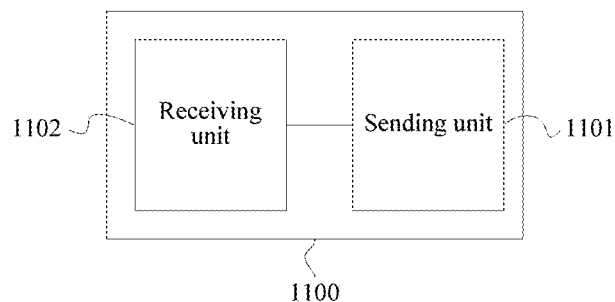
FIG. 11 is a schematic structural diagram of a client according to an embodiment of the present disclosure.

According to the lock management solution in a cluster provided in the embodiments of the present disclosure, a client 1100 is provided correspondingly. As shown in FIG. 11, the client 1100 is applied to a cluster and serves as a first client in multiple clients in the cluster. The cluster further includes the lock server described in the embodiments of the present disclosure, the lock server includes an interface card and a memory, and the memory stores a write lock request queue, a write lock allocation identifier, and a read lock allocation count. The write lock request queue is used to record identifiers of clients in the cluster, including an identifier of a client that is in a write lock waiting state for a shared resource and an identifier of a client that obtains a write lock for the same shared resource, the write lock allocation identifier is used to indicate whether the write lock for the shared resource is allocated, and the read lock allocation count is used to indicate a quantity of read locks allocated for the shared resource. The client 1100 includes a sending unit 1101 and a receiving unit 1102. The sending unit 1101 is configured to send a first write lock request to the interface card of the lock server, where the first write lock request carries an identifier of the client 1100 and a memory address of a queue head of the write lock request queue. The receiving unit 1102 is configured to receive a first message sent by the interface card, where the first message indicates that the interface card writes the identifier of the client 1100 into the memory address of the queue head of the write lock request queue and indicates that the client 1100 obtains the write lock or is in a write lock waiting state. The sending unit 1101 is further configured to send a second write lock request to the interface card when the first message indicates that the interface card fails in writing the identifier of the client 1100 into the memory address of the queue head of the write lock request queue, where the second write lock request carries the identifier of the client 1100 and a first memory address in the write lock request queue, where the first memory address is a memory address which is in a sequence from the queue head to a queue tail and into which the identifier of the client 1100 can be written. Optionally, the first memory address is a first memory address which is in the sequence from the queue head to the queue tail and into which the identifier of the client 1100 can be written.

In the client 1100, which is shown in FIG. 11, provided in this embodiment of the present disclosure, optionally, the sending unit 1101 is further configured to send a write lock release request to the interface card after the client 1100 obtains the write lock, where the write lock release request carries the memory address of the queue head of the write lock request queue.

In another embodiment of the present disclosure, the client 1100 shown in FIG. 11 is applied to a cluster and serves as a first client in multiple clients. The cluster further includes a lock server, the lock server includes an interface card and a memory, and the memory stores a read lock request queue and a write lock allocation identifier. The read lock request queue is used to record an identifier of a client that is in the cluster and that is in a read lock waiting state or obtains a read lock for a same shared resource, and the write lock allocation identifier is used to indicate whether a write lock for the shared resource is allocated. A sending unit 1101 is configured to send a first read lock request to the interface card, where the first read lock request carries an identifier of the client 1100 and a first memory address in the read lock request queue. A receiving unit 1102 is configured to receive a first message sent by the interface card, where the first message carries the write lock allocation identifier. Optionally, when the write lock allocation identifier indicates that the write lock has been allocated, the first message indicates that the client 1100 is in a read lock waiting state. Optionally, when the write lock allocation identifier indicates that the write lock is not allocated, the first message indicates that the client 1100 obtains a read lock. Optionally, the multiple clients further include a second client, and an identifier of the second client is stored in a memory address of a queue head of the read lock request queue. In this case, the first memory address, which is carried in the first read lock request, in the read lock request queue is a memory address which is in a sequence from the queue head to a queue tail of the read lock request queue and into which the identifier of the client 1100 can be written. Optionally, the first memory address is a first memory address which is in the sequence from the queue head to the queue tail of the read lock request queue and into which the identifier of the client 1100 can be written. Optionally, before sending the first read lock request to the interface card, the sending unit 1101 is further configured to send a second read lock request to the interface card, where the second read lock request carries the identifier of the client 1100 and the memory address of the queue head of the read lock request queue. When the interface card fails in writing the identifier of the client 1100 into the memory address of the queue head of the read lock request queue, the receiving unit 1102 is further configured to receive a second message sent by the interface card, where the second message indicates that the read lock request fails. Optionally, when the client 1100 obtains the read lock, the sending unit 1101 is further configured to send a read lock release request to the interface card, where the read lock release request carries the memory address which is in the read lock request queue and in which the identifier of the client 1100 is stored.

In another embodiment of the present disclosure, the client 1100 shown in FIG. 11 is applied to a cluster and serves as a first client, and the cluster further includes a lock server and a second client. The lock server includes an interface card and a memory, the memory stores a write lock request queue and a write lock allocation identifier, an identifier of the client 1100 is stored in a memory address of a queue head of the write lock request queue, the write lock request queue further stores an identifier of the second client, the write lock allocation identifier indicates that a write lock has been allocated, the client 1100 obtains the write lock for a shared resource, and the second client is in a write lock waiting state for the shared resource. A sending unit 1101 is configured to send a write lock release request to the interface card, where the write lock release request carries the memory address of the queue head of the write lock request queue, and send a write lock request query message to the interface card when the interface card deletes the identifier of the client 1100 from the write lock request queue according to the memory address of the queue head of the write lock request queue, where the write lock request query message carries a memory address which is in the write lock request queue and in which the identifier of the second client is stored. A receiving unit 1102 is configured to receive a write lock request query response message sent by the interface card, where the write lock request query response message carries the identifier of the second client. The sending unit 1101 is configured to send a write lock occupation request to the interface card, where the write lock occupation request carries the identifier of the second client and the memory address of the queue head of the write lock request queue. The receiving unit 1102 is further configured to receive a write lock occupation request response sent by the interface card, where the write lock occupation request response indicates that the identifier of the second client is written into the memory address of the queue head of the write lock request queue. The sending unit 1101 is further configured to send a notification to the second client, where the notification indicates that the second client obtains the write lock. Optionally, the memory address which is in the write lock request queue and in which the identifier of the second client is stored is a next memory address following the queue head of the write lock request queue. Optionally, the write lock request queue further stores a write lock priority of the second client, where the write lock priority of the second client is the highest among clients that are in a write lock waiting state and that are recorded in the write lock request queue.

In another embodiment of the present disclosure, the client 1100 shown in FIG. 11 is applied to a cluster and serves as a first client, and the cluster further includes a lock server and a second client. The lock server includes an interface card and a memory, and the memory stores a write lock request queue, a read lock request queue, a read lock allocation count, and a write lock allocation identifier. An identifier of the client 1100 is stored in a memory address of a queue head of the write lock request queue, the read lock request queue stores an identifier of the second client, the write lock allocation identifier indicates that a write lock has been allocated, the read lock allocation count is 0, the client 1100 obtains the write lock for a shared resource, and the second client is in a read lock waiting state for the shared resource. A sending unit 1101 is configured to send a write lock release request to the interface card, where the write lock release request carries the memory address of the queue head of the write lock request queue, and when the interface card sets the write lock allocation identifier to a write lock unallocated state and deletes the identifier of the client 1100 from the write lock request queue according to the memory address of the queue head of the write lock request queue, send a read lock request query message to the interface card. A receiving unit 1102 is configured to receive a read lock request query response message sent by the interface card, where the write lock request query response message carries the identifier of the second client. The sending unit 1101 is further configured to send a read lock allocation count modification request to the interface card such that the second client obtains a read lock.

In another embodiment of the present disclosure, the client 1100 shown in FIG. 11 is applied to a cluster and serves as a first client, and the cluster further includes a lock server and a second client. The lock server includes an interface card and a memory, and the memory stores a write lock request queue and a write lock allocation identifier. An identifier of the client 1100 is stored in a memory address of a queue head of the write lock request queue, the write lock request queue further stores an identifier of the second client, the write lock allocation identifier indicates that a write lock has been allocated, the client 1100 obtains the write lock for a shared resource, and the second client is in a write lock waiting state for the shared resource. A sending unit 1101 is configured to send a write lock release request to the interface card, where the write lock release request carries the memory address of the queue head of the write lock request queue, and when the interface card sets the write lock allocation identifier to a write lock unallocated state and deletes the identifier of the client 1100 from the write lock request queue according to the memory address of the queue head of the write lock request queue, send a write lock request query message to the interface card, where the write lock request query message carries a memory address which is in the write lock request queue and in which the identifier of the second client is stored. A receiving unit 1102 is configured to receive a write lock request query response message sent by the interface card, where the write lock request query response message carries the identifier of the second client. The sending unit 1101 sends a notification to the second client according to the identifier of the second client, where the notification is used to instruct the second client to send a write lock request to the interface card. Optionally, the memory address which is in the write lock request queue and in which the identifier of the second client is stored is a next memory address following the queue head of the write lock request queue. Optionally, the write lock request queue further stores a write lock priority of the second client, where the write lock priority of the second client is the highest among clients that are in a write lock waiting state and that are recorded in the write lock request queue.

In another embodiment of the present disclosure, the client 1100 shown in FIG. 11 is applied to a cluster and serves as a first client, and the cluster further includes a lock server and a second client. The lock server includes an interface card and a memory, and the memory stores a write lock request queue, a read lock request queue, a read lock allocation count, and a write lock allocation identifier. An identifier of the client 1100 is stored in a memory address of a queue head of the write lock request queue, the read lock request queue stores an identifier of the second client, the write lock allocation identifier indicates that a write lock has been allocated, the read lock allocation count is 0, the client 1100 obtains the write lock for a shared resource, and the second client is in a read lock waiting state for the shared resource. A sending unit 1101 is configured to send a write lock release request to the interface card, where the write lock release request carries the memory address of the queue head of the write lock request queue, and send a read lock request query message to the interface card when the interface card sets the write lock allocation identifier to a write lock unallocated state and deletes the identifier of the client 1100 from the write lock request queue according to the memory address of the queue head of the write lock request queue. A receiving unit 1102 is configured to receive a read lock request query response message sent by the interface card, where the read lock request query response message carries the identifier of the second client. The sending unit 1101 is further configured to send a notification to the second client according to the identifier of the second client, where the notification is used to instruct the second client to apply for a read lock. The second client sends a read lock allocation count modification request to the interface card according to the notification. The interface card increases the read lock allocation count according to a quantity of read locks allocated to the second client.

In another embodiment of the present disclosure, the client 1100 shown in FIG. 11 is applied to a cluster and serves as a first client, and the cluster further includes a lock server and a second client. The lock server includes an interface card and a memory, and the memory stores a write lock request queue, a read lock request queue, a read lock allocation count, and a write lock allocation identifier. The read lock request queue stores an identifier of the client 1100, an identifier of the second client is stored in a memory address of a queue head of the write lock request queue, the write lock allocation identifier indicates that a write lock is not allocated, the read lock allocation count is a quantity of read locks obtained by the client 1100, the client 1100 obtains a read lock for a shared resource, and the second client is in a write lock waiting state for the shared resource. A sending unit 1101 is configured to send a read lock release request to the interface card, where the read lock release request carries a memory address which is in the read lock request queue and in which the identifier of the client 1100 is stored, and when the interface card decreases the read lock allocation count to 0 and deletes the identifier of the client 1100 from the read lock request queue according to the memory address which is in the read lock request queue and in which the identifier of the client 1100 is stored, send a write lock request query message to the interface card, where the write lock request query message carries the memory address of the queue head of the write lock request queue. A receiving unit 1102 is configured to receive a write lock request query response message sent by the interface card, where the write lock request query response message carries the identifier of the second client. The sending unit 1101 is further configured to send a notification to the second client according to the identifier of the second client, where the notification is used to instruct the second client to apply for the write lock. The second client sends a write lock allocation identifier modification request to the interface card according to the notification. The interface card sets the write lock allocation identifier to a write lock allocated state.

In another embodiment of the present disclosure, the client 1100 shown in FIG. 11 is applied to a cluster and serves as a first client, and the cluster further includes a lock server and a second client. The lock server includes an interface card and a memory, and the memory stores a write lock request queue, a read lock request queue, a read lock allocation count, and a write lock allocation identifier. The read lock request queue stores an identifier of the client 1100, an identifier of the second client is stored in a memory address of a queue head of the write lock request queue, the write lock allocation identifier indicates that a write lock is not allocated, the read lock allocation count is a quantity of read locks obtained by the client 1100, the client 1100 obtains a read lock for a shared resource, and the second client is in a write lock waiting state for the shared resource. A sending unit 1101 is configured to send a read lock release request to the interface card, where the read lock release request carries a memory address which is in the read lock request queue and in which the identifier of the client 1100 is stored, and when the interface card decreases the read lock allocation count to 0 and deletes the identifier of the client 1100 from the read lock request queue according to the memory address which is in the read lock request queue and in which the identifier of the client 1100 is stored, send a write lock request query message to the interface card, where the write lock request query message carries the memory address of the queue head of the write lock request queue. A receiving unit 1102 receives a write lock request query response message sent by the interface card, where the write lock request query response message carries the identifier of the second client. The sending unit 1101 is further configured to send a write lock allocation identifier modification request to the interface card, and when the interface card sets the write lock allocation identifier to a write lock allocated state according to the write lock allocation identifier modification request, send a notification to the second client according to the identifier of the second client, where the notification indicates that the second client obtains the write lock.

For functions implemented by the client 1100 provided in this embodiment of the present disclosure, reference may be made to the description corresponding to the client A, the client B, the client C, and the client D in the foregoing embodiments. For effects implemented by the client 1100, reference may be made to the description in the foregoing embodiments.

For the client 1100 shown in FIG. 11, an implementation manner is that the foregoing units are installed on the client 1100, where the foregoing units may be loaded into a memory of the client 1100, and a CPU of the client 1100 executes an instruction in the memory to implement the functions in the corresponding embodiments of the present disclosure. In another implementation, the units included in the client 1100 may be implemented by hardware, or implemented by a combination of software and hardware. The foregoing units are also referred to as structural units.

This embodiment of the present disclosure further provides a non-volatile computer readable storage medium and a computer program product. When a computer instruction included in the non-volatile computer readable storage medium and the computer program product is loaded into the memory of the client 1100 shown in FIG. 11, the CPU executes the computer instruction loaded in the memory to implement the corresponding functions in the embodiments of the present disclosure.

In the several embodiments provided in the present disclosure, it should be understood that the disclosed apparatus and method may be implemented in other manners. For example, the unit division in the described apparatus embodiment is merely logical function division and may be other division in actual implementation. For example, a plurality of units or components may be combined or integrated into another system, or some features may be ignored or not performed. In addition, the shown or discussed mutual couplings or direct couplings or communication connections may be implemented using some interfaces. The indirect couplings or communication connections between the apparatuses or units may be implemented in electrical, mechanical, or other forms.

The units described as separate parts may or may not be physically separated, and parts shown as units may or may not be physical units, may be located in one position, or may be distributed on a plurality of network units. Some or all of the units may be selected according to actual needs to achieve the objectives of the solutions of the embodiments.

In addition, functional units in the embodiments of the present disclosure may be integrated into one processing unit, or each of the units may exist alone physically, or two or more units are integrated into one unit.

What is claimed is:

1. A lock server comprising:
a memory configured to:
   store a read lock request queue, wherein the read lock request queue records an identifier of a client that is in a client cluster and is either in a read lock waiting state or obtaining a read lock for a shared resource, and wherein the read lock request queue further records a write lock allocation identifier indicating whether a write lock for the shared resource is allocated; and
   store a read lock allocation count indicating a quantity of read locks allocated for the shared resource; and
an interface card coupled to the memory and configured to:
   receive, from a first client in the client cluster, a first read lock request carrying an identifier of the first client and carrying a first memory address in the read lock request queue;
   write the identifier of the first client into the first memory address;
   increase the read lock allocation count according to a quantity of read locks allocated to the first client when the write lock allocation identifier indicates that the write lock is not allocated; and
   send, to the first client, a first message carrying the write lock allocation identifier and indicating that the first client obtains the read lock.

2. The lock server of claim 1, wherein the first message further indicates that the first client is in the read lock waiting state when the write lock allocation identifier indicates that the write lock has been allocated.

3. The lock server of claim 2, wherein the memory is further configured to store a write lock request queue, wherein the write lock request queue records an identifier of a client that is in the client cluster and is in a write lock waiting state for the shared resource, an identifier of a client that is in the client cluster and is obtaining the write lock for the shared resource, and an identifier that is of a second client in the client cluster and that is being stored in a memory address of a queue head of the write lock request queue when the write lock allocation identifier indicates that the write lock has been allocated.

4. The lock server of claim 1, wherein an identifier of a third client in the client cluster is stored in a memory address of a queue head of the read lock request queue, and wherein the first memory address comprises a memory address in a sequence from the queue head to a queue tail of the read lock request queue into which the identifier of the first client can be written.

5. The lock server of claim 1, wherein the first client obtains the read lock, and wherein the interface card is further configured to:
   receive, from the first client, a read lock release request carrying the first memory address;
   decrease the read lock allocation count according to the quantity of read locks allocated to the first client; and
   delete the identifier of the first client from the first memory address.

6. The lock server of claim 1, wherein the first client becomes faulty after obtaining the read lock, and wherein the interface card is further configured to:
   decrease the read lock allocation count according to the quantity of read locks allocated to the first client; and
   delete the identifier of the first client from the first memory address.

7. A lock management method comprising:
- storing, by a memory of a lock server, a read lock request queue, wherein the read lock request queue records an identifier of a client that is in a client cluster and is either in a read lock waiting state or that-is-obtaining a read lock for a shared resource, and wherein the read lock request queue further records a write lock allocation identifier indicating whether a write lock for the shared resource is allocated;
- storing, by the memory, a read lock allocation count indicating a quantity of read locks allocated for the shared resource;
- receiving, by an interface card of the lock server and from a first client in the client cluster, a first read lock request carrying an identifier of the first client and carrying a first memory address in the read lock request queue;
- writing, by the interface card, the identifier of the first client into the first memory address;
- increasing, by the interface card, the read lock allocation count according to a quantity of read locks allocated to the first client when the write lock allocation identifier indicates that the write lock is not allocated; and
- sending, by the interface card and to the first client, a first message carrying the write lock allocation identifier and indicating that the first client obtains the read lock.

8. The lock management method of claim 7, further comprising storing, by the memory, a write lock request queue, wherein the write lock request queue records an identifier of a client that is in the client cluster and is in a write lock waiting state for the shared resource, an identifier of a client obtaining the write lock for the shared resource, and an identifier that is of a second client in the client cluster and that is being stored in a memory address of a queue head of the write lock request queue when the write lock allocation identifier indicates that the write lock has been allocated.

9. The lock management method of claim 8, further comprising:
- receiving, by the interface card and from the first client, a read lock release request carrying the first memory address;
- decreasing, by the interface card, the read lock allocation count according to the quantity of read locks allocated to the first client; and
- deleting, by the interface card, the identifier of the first client from the first memory address.

10. The lock management method of claim 8, further comprising:
- decreasing, by the interface card, the read lock allocation count according to the quantity of read locks allocated to the first client; and
- deleting, by the interface card, the identifier of the first client from the first memory address.

11. The lock management method of claim 7, wherein an identifier of a third client in the client cluster is stored in a memory address of a queue head of the read lock request queue, and wherein the first memory address comprises a memory address in a sequence from the queue head to a queue tail of the read lock request queue into which the identifier of the first client can be written.

12. A computer program product comprising computer-executable instructions for storage on a non-transitory computer-readable medium that, when executed by a processor, cause an apparatus to:
- store a read lock request queue, wherein the read lock request queue records an identifier of a client that is in a client cluster and that is either in a read lock waiting state or obtaining a read lock for a shared resource, and wherein the read lock request queue further records a write lock allocation identifier indicating whether a write lock for the shared resource is allocated;
- store a read lock allocation count indicating a quantity of read locks allocated for the shared resource;
- receive, from a first client in the client cluster, a first read lock request carrying an identifier of the first client and carrying a first memory address in the read lock request queue;
- write the identifier of the first client into the first memory address;
- increase the read lock allocation count according to a quantity of read locks allocated to the first client when the write lock allocation identifier indicates that the write lock is not allocated; and
- send, to the first client, a first message carrying the write lock allocation identifier.

13. The computer program product of claim 12, wherein the instructions further cause the apparatus to store a write lock request queue, wherein the write lock request queue records an identifier of a client that is in the client cluster and is in a write lock waiting state for the shared resource, an identifier of a client that is in the client cluster and is obtaining the write lock for the shared resource, and an identifier that is of a second client in the client cluster and that is being stored in a memory address of a queue head of the write lock request queue when the write lock allocation identifier indicates that the write lock has been allocated.

14. The computer program product of claim 12, wherein an identifier of a third client in the client cluster is stored in a memory address of a queue head of the read lock request queue.

15. The computer program product of claim 14, wherein the first memory address comprises a memory address in a sequence from the queue head to a queue tail of the read lock request queue into which the identifier of the first client can be written.

16. The computer program product of claim 12, wherein the instructions further cause the apparatus to receive, from the first client, a read lock release request carrying the first memory address.

17. The computer program product of claim 16, wherein the instructions further cause the apparatus to decrease the read lock allocation count according to the quantity of read locks allocated to the first client.

18. The computer program product of claim 17, wherein the instructions further cause the apparatus to delete the identifier of the first client from the first memory address.

19. The computer program product of claim 12, wherein the instructions further cause the apparatus to decrease the read lock allocation count according to the quantity of read locks allocated to the first client.

20. The computer program product of claim 19, wherein the instructions further cause the apparatus to delete the identifier of the first client from the first memory address.

* * * * *

UNITED STATES PATENT AND TRADEMARK OFFICE
CERTIFICATE OF CORRECTION

PATENT NO. : 10,609,150 B2  
APPLICATION NO. : 16/287479  
DATED : March 31, 2020  
INVENTOR(S) : Lan et al.

Page 1 of 1

It is certified that error appears in the above-identified patent and that said Letters Patent is hereby corrected as shown below:

In the Claims

Claim 7, Column 39, Line 5: "or that-is-obtaining a" should read "or obtaining a"

Signed and Sealed this  
Thirteenth Day of April, 2021

Drew Hirshfeld  
*Performing the Functions and Duties of the*  
*Under Secretary of Commerce for Intellectual Property and*  
*Director of the United States Patent and Trademark Office*